United States Patent
Barash et al.

(10) Patent No.: US 9,268,648 B1
(45) Date of Patent: Feb. 23, 2016

(54) SYSTEM AND METHOD FOR CONSISTENCY VERIFICATION OF REPLICATED DATA IN A RECOVERY SYSTEM

(71) Applicant: ZERTO LTD., Herzliya (IL)

(72) Inventors: Gil Barash, Tel-Aviv (IL); Nathaniel Leibowitz, Tel-Aviv (IL)

(73) Assignee: ZERTO LTD., Herzliya (IL)

( * ) Notice: Subject to any disclaimer, the term of this patent is extended or adjusted under 35 U.S.C. 154(b) by 0 days.

(21) Appl. No.: 14/810,538

(22) Filed: Jul. 28, 2015

(51) Int. Cl.
*G06F 11/00* (2006.01)
*G06F 11/14* (2006.01)

(52) U.S. Cl.
CPC ........ *G06F 11/1451* (2013.01); *G06F 11/1469* (2013.01); *G06F 2201/805* (2013.01); *G06F 2201/84* (2013.01)

(58) Field of Classification Search
CPC .................................................... G06F 11/1451
See application file for complete search history.

(56) References Cited

U.S. PATENT DOCUMENTS

| | | | | |
|---|---|---|---|---|
| 8,140,637 B2 * | 3/2012 | Slater | ................. | G06F 11/1451 709/213 |
| 8,332,404 B2 * | 12/2012 | Camble | ............. | G06F 17/30162 707/736 |
| 8,341,371 B2 * | 12/2012 | Lasser | ................. | G06F 12/0246 711/103 |
| 2004/0139128 A1 * | 7/2004 | Becker | ................. | G06F 11/1456 |
| 2005/0066245 A1 * | 3/2005 | Von Wendorff | ..... | G06F 11/1008 714/732 |
| 2006/0048002 A1 * | 3/2006 | Kodi | ................... | G06F 11/1448 714/13 |
| 2007/0220197 A1 * | 9/2007 | Lasser | ................. | G06F 12/0246 711/103 |
| 2013/0325824 A1 * | 12/2013 | Shoens | ............. | G06F 17/30115 707/698 |
| 2014/0108348 A1 * | 4/2014 | Ahrens | ............. | G06F 17/30174 707/639 |
| 2015/0220402 A1 * | 8/2015 | Cantwell | ............. | G06F 11/1451 707/646 |

* cited by examiner

*Primary Examiner* — Christopher McCarthy
(74) *Attorney, Agent, or Firm* — Pearl Cohen Zedek Latzer Baratz LLP

(57) ABSTRACT

A system and method for verifying consistency of data in a recovery system, the method including: protecting data in the recovery system, the recovery system includes a target disk configured to store a replica of a protected storage system from before a time window and a journal including data and metadata of write operations to the protected storage system that occurred during the time window; verifying consistency of the replicated data, concurrently with the protecting by: copying data of a selected chunk of the protected storage system at a specified time point, while monitoring write operations to the protected system; generating a replica of the selected chunk in the recovery system from the target disk and the journal, from the specified time point; comparing the copied data of the selected chunk with the replica of the selected chunk and repeating the copying, generating and comparing for a plurality of chunks.

29 Claims, 7 Drawing Sheets

SYSTEM AND METHOD FOR CONSISTENCY VERIFICATION OF REPLICATED DATA IN A RECOVERY SYSTEM

FIELD OF THE INVENTION

The present invention relates generally to consistency verification of a recovery system. More specifically, the present invention relates to consistency verification of a recovery system including a target disk and a journal.

BACKGROUND OF THE INVENTION

Data protection systems and methods are known in the art. Generally, data protection systems continuously copy data from a protected storage or system to a recovery storage or system. For example, systems that replicate the content of disks to a recovery system or site, e.g., in a different geographic location are known. Data in a recovery site typically includes information related to the protected disks or storage system, e.g., history, as known in the art. Historical information enables recovering disk content at any point in time within a specified history.

Replacing a system with a replica generated by the recovery system is referred to in the art as fail-over. For example, a user can fail-over a system in an organization (including disks or other storage systems) by initiating a system at a recovery site and be provided with disks' content of the organization's system by the system at the recovery site.

A fail-over can be done for a specific point in time. For example, a system (e.g., a disk) at a recovery site can be configured to replace a protected system such that content in the system at a recovery site is same or similar to the content that was stored in the protected system at a specified date or time.

Typical scenarios that will result in failing-over of a protected system may, for example, occur when the protected system is inaccessible, or may include a planned migration of a protected system from a protected site to a recovery site or recovery system. For instance, suppose that the user protects a system that is, or serves as, a mail exchange server. If a hurricane hits the site that runs the protected system, the user can fail-over the protected system to a recovery site or recovery system with the latest available point in time and enable end users to use the failed-over (or recovery) system in the recovery site as their mail exchange server.

Object storage (also known as object-based storage) is known in the art. Object storage techniques or object-based storage systems or architectures are available, e.g., the online storage web service S3 offered by Amazon. Object Storage technique uses a digital data storage architecture or platform that stores and manages data as objects or containers (e.g., buckets in S3). Object Storage is simpler than other architectures (e.g., file system) and offers advantages such as scalability and low cost.

Current data protection systems provide limited options for verifying the consistency of the replicated data, e.g., for verifying that the replicated data at the recovery system is identical to the original data at the protected system.

A known method for verifying the consistency of the replicated data may be referred to as the 'boot test'. The boot test for verifying the consistency of the replicated data includes generating, at the recovery site, a working machine for a specified time point, referred to as a recovered virtual machine (VM), and testing that the generated recovered VM completes a boot process successfully. Obviously, the boot test verifies only that no major failures that prevent completion of the boot process have occurred and that the recovered VM does not crash. The boot test, however, does not guarantee that the data in the recovery system is identical to the source at the desired point of time. After a working machine is generated and the boot process is completed successfully, consistency of specific files may be verified by comparing specific files from the protected system with their generated replica. Another method for detecting inconsistencies is to have client applications, such as Structured Query Language (SQL), read files from the booted recovered machine, and check if it is able to parse and handle the recovered files.

The above mentioned methods are limited in their scopes, and are inefficient in that they require the recovered VM to boot. In addition, the 'boot test' does not enable a continuous online verification procedure, and is performed at the file system level rather than on raw data level.

SUMMARY OF THE INVENTION

According to some embodiments of the present invention, there is provided a computer-implemented method of verifying consistency of data in a recovery system, and the method may include: protecting data in the recovery system, wherein the recovery system may include a target disk configured to store a replica of a protected storage system from before a time window and a journal including data and metadata of write operations to the protected storage system that occurred during the time window; verifying consistency of the replicated data, concurrently with the protecting by: copying data of a selected chunk of the protected storage system at a specified time point, while monitoring write operations to the protected system; generating a replica of the selected chunk in the recovery system from the target disk and the journal, from the specified time point; comparing the copied data of the selected chunk with the replica of the selected chunk; repeating the copying, generating and comparing for a plurality of chunks; and reporting results of the comparison to a user.

Furthermore, according to some embodiments of the present invention, the method may include: repeating the verifying for substantially all chunks of the protected storage system in a cyclic manner.

Furthermore, according to some embodiments of the present invention, comparing the copied data with the replica may be performed bit by bit.

Furthermore, according to some embodiments of the present invention, the method may include amending data stored in the recovery system according to the data of the copied chunk.

Furthermore, according to some embodiments of the present invention, verifying may include: generating a signature of the copied data; generating a signature of the replica, and comparing the copied data with the replica may be performed by comparing the signature of the copied data with the signature of the replica.

Furthermore, according to some embodiments of the present invention, attempted write operations to the selected chunk that occur during the copying may be discarded.

Furthermore, according to some embodiments of the present invention, attempted write operations to the selected chunk that occur during the copying may be stored in a queue and performed after the copying is completed.

Furthermore, according to some embodiments of the present invention, attempted write operations to the protected storage system that occur during the copying may be stored in a queue and performed after the copying is completed.

Furthermore, according to some embodiments of the present invention, attempted write operations to the protected storage system during the copying, that occur after an attempted write operation to the selected chunk is detected, may be stored in a queue and performed after the copying is completed.

Furthermore, according to some embodiments of the present invention, verifying of the selected chunk may be stopped if a write operation to the selected chunk is detected.

Furthermore, according to some embodiments of the present invention, the recovery system may be an object-based recovery system.

Furthermore, according to some embodiments of the present invention, generating the replica may include: requesting from the recovery system data of the selected chunk from the journal and target disk, from the specified time point; and combining the obtained data to produce the replica of the selected chunk from the specified time point.

Furthermore, according to some embodiments of the present invention, protecting the data in the recovery system may include: storing, in the target disk, the replica of the protected storage system from before the time window; obtaining information related to a write operation in the protected storage system, the information including: copy of data stored on the protected storage system, and metadata related to the stored data; maintaining the journal by: storing a copy of the stored data in a content entry; storing at least a portion of the metadata in a metadata entry; and associating the metadata entry with the content entry; and periodically applying data received before a predetermined time window from the journal to the target disk.

Furthermore, according to some embodiments of the present invention, the method may include: generating a persistent region-locator, wherein the persistent region-locator includes a list of offsets and, for an offset in the list, a reference to a content entry that includes data of the last write to the offset; wherein generating the replica may include: updating the persistent region-locator to the specified time point by: removing applied write operations from the persistent region-locator; and adding new write operations that occurred after the previous chunk was copied and before the selected chunk was copied to the persistent region-locator. The persistent region-locator may be used to produce the replica of data of the selected chunk by: copying data from content entries in the journal for the offsets in the list; and copying data from the target disk for other offsets.

Furthermore, according to some embodiments of the present invention, generating the replica may include: examining metadata entries in the journal to identify entries related to last write operations to the selected chunk that occurred before the specified time point; generating a region-locator, wherein the region-locator includes a list of offsets and, for an offset in the list, a reference to a content entry that includes data of the last write to the offset. The region-locator may be used to produce the replica of data of the selected chunk by: copying data from content entries in the journal for the offsets in the list; and copying data from the target disk for other offsets.

According to some embodiments of the present invention, there is provided a system, which system may include: a recovery system configured to protect data of a protected storage system, wherein the recovery system may include: a target disk configured to store a replica of the protected storage system from before a time window; and a journal may include data and metadata of write operations to the protected storage system that occurred during the time window; a storage device; a processor configured to verify consistency of the replicated data, concurrently with the protecting, by: receiving a signature of a selected chunk of the protected storage system at a specified time point; generating a replica of the selected chunk from the target disk and the journal, from the specified time point; generating a signature of the replica; comparing the signature of the selected chunk with the signature of the replica; repeating the receiving, generating and comparing for a plurality of chunks; and reporting results of the comparison to a user. The processor may be further configured to repeat the copying, generating and comparing for substantially all chunks of the protected storage system in a cyclic manner.

Furthermore, according to some embodiments of the present invention, the system may further include a protected storage system, wherein the protected storage system may be configured to: copy the data of the selected chunk of the protected storage system at the specified time point, while monitoring attempted write operations to the protected system; generate a signature of the copied data; and send the signature to the processor.

Furthermore, according to some embodiments of the present invention, the recovery system may be configured to amend data stored in the recovery system according to the data of the copied chunk.

Furthermore, according to some embodiments of the present invention, the protected storage system may be configured to discard attempted write operations to the selected chunk that occur during the copying.

Furthermore, according to some embodiments of the present invention, the protected storage system may be configured to store attempted write operations to the selected chunk that occur during the copying in a queue and to perform the stored attempted write operations after the copying is completed.

Furthermore, according to some embodiments of the present invention, the protected storage system may be configured to store attempted write operations to the protected storage system that occur during the copying in a queue and to perform the stored attempted write operations after the copying is completed.

Furthermore, according to some embodiments of the present invention, the protected storage system may be configured to: detect attempted write operation to the chunk; store attempted write operations to the protected storage system that occur after an attempted write operation to the selected chunk is detected and during the copying in a queue; and perform the stored attempted write operations after the copying is completed.

Furthermore, according to some embodiments of the present invention, the protected storage system may be configured to stop the verifying of the selected chunk if an attempted write operation to the selected chunk is detected.

Furthermore, according to some embodiments of the present invention, the recovery system may be an object based recovery system.

Furthermore, according to some embodiments of the present invention, the recovery system may be configured to protect data by: storing, in the target disk, the replica of the protected storage system from before the time window; obtaining information related to a write operation in the protected storage system, the information including: a copy of data stored on the protected storage system, and metadata related to the stored data; maintaining the journal by: storing a copy of the stored data in a content entry; storing at least a portion of the metadata in a metadata entry; and associating the metadata entry with the content entry; and periodically applying data received before the time window from the journal to the target disk.

Furthermore, according to some embodiments of the present invention, the processor may be configured to generate the replica of the selected chunk by: examining metadata entries in the journal to identify entries related to last write operations, that occurred before the specified time point; generating a region-locator, wherein the region-locator includes a list of offsets and, for an offset in the list, a reference to a content entry that includes data of the last write to the offset; and using the region-locator to produce the replica of the selected chunk by: copying data from content entries in the journal for the offsets in the list; and copying data from the target disk for other offsets.

Furthermore, according to some embodiments of the present invention, the processor may be configured to: generate a persistent region-locator, wherein the persistent region-locator includes a list of offsets and, for an offset in the list, a reference to a content entry that includes data of the last write to the offset; and generate the replica by: updating the persistent region-locator to the specified time point by: removing applied write operations from the persistent region-locator; and adding new write operations that occurred after the previous chunk was copied and before the selected chunk was copied to the persistent region-locator; and using the persistent region-locator to produce the replica of data of the selected chunk by: copying data from content entries in the journal for the offsets in the list; and copying data from the target disk for other offsets.

According to some embodiments of the present invention, there is provided a system, which system may include: a recovery system configured to protect data of a protected storage system, wherein the recovery system may include: a target disk configured to store a replica of the protected storage system from before a time window; and a journal may include data and metadata of write operations to the protected storage system that occurred during the time window; a storage device; a processor configured to verify consistency of the replicated data, concurrently with the protecting, by: receiving data of a selected chunk of the protected storage system at a specified time point; generating a replica of the selected chunk in the recovery system from the target disk and the journal, from the specified time point; comparing the copied data with the replica of the chunk; repeating the copying, generating and comparing for a plurality of chunks; and reporting results of the comparison to a user. The processor may be further configured to repeat the copying, generating and comparing for substantially all chunks of the protected storage system in a cyclic manner.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
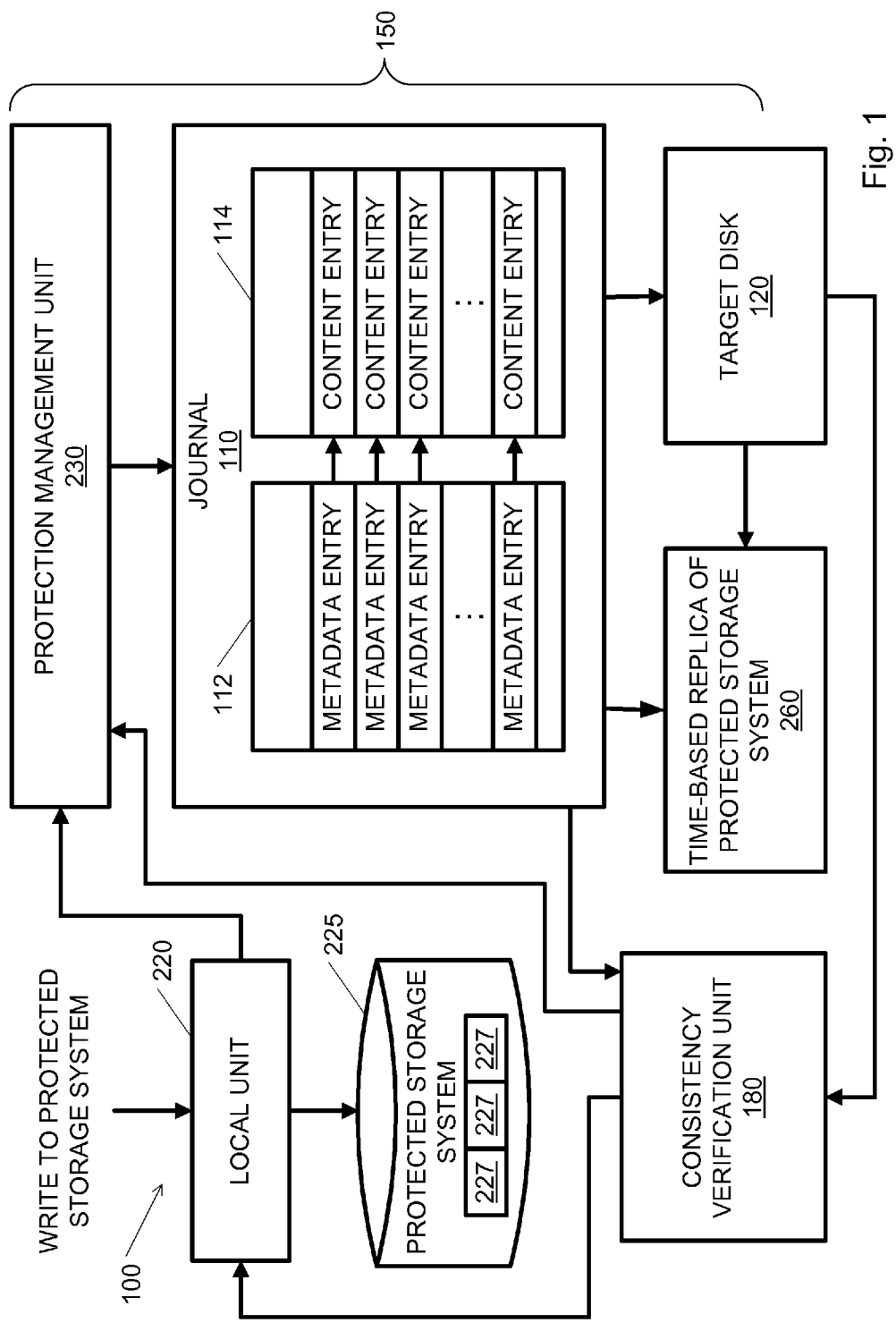
FIG. 1 is an overview of a system according to some embodiments of the present invention.

It will be appreciated that, for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

A system and method according to some embodiments of the invention may store data obtained from a protected system in a recovery system. Data in a recovery system may be stored in two containers: a journal that may store all latest or recent writes to a protected system in a configured history period or time window; and a target disk data container that may store or save the rest of the data written to the protected system, e.g., a replica of the protected storage system from a predetermined time point. For example, if a protected disk or machine is configured to have one (1) hour history, then data in a target disk at a recovery system may contain a copy of content of the protected disk from one hour ago, and a journal may contain a copy of all writes to the protected disk that were done in the last hour. As used herein, the term target disk may refer to a data storage, for example, a plurality of objects (in the same or in other object storage as the journal), or any other data storage that may serve as data container that may store or save the data written to the protected system before the time window, e.g., data written to the protected system that is not saved in the journal.

In some embodiments, a recovery system may be located in a remote site (recovery site). For example, a remote site may be geographically remote from the protected system. For example, a protected system may be located in a first city or state, and a recovery system may be located in another city or state. In other embodiments, a recovery system may be co-located with the protected system or even embedded in the protected system. It will be understood that a protected system as referred to herein may be any applicable digital content storage system. For example, a protected system may be a set or array of disks attached to a computer or server (e.g., a redundant array of independent disks (RAID) as known in the art), or it may be a virtual machine (VM) connected to one or more virtual disks as known in the art.

A system and method according to some embodiments of the invention may verify consistency of replicated data in a recovery system. Some embodiments of the present invention may provide an automatic, non-invasive, continuous and thorough consistency check of the replicated data at the raw bit level, e.g., with no need to generate a working machine and performing boot process.

A system and method according to some embodiments of the invention may include a number of units or processes. For example, a first unit, process or method may capture data written to, or stored on, a disk of a protected system, e.g., a physical, a virtual disk or a virtual machine (VM). A second unit, process or method may insert a copy of the captured data into a journal as further described herein. A third unit, process or method may extract data related to data writes in a journal and apply the data writes to a target disk as further described herein. As used herein, applying the data to a target disk may refer to the process of copying data from the journal to the target disk and deleting the copied data and related metadata from the journal. A fourth unit, process or method may use the journal and the target disk to generate, create or prepare disk replica of the protected disk or system, where the replica is from a certain or selected point in time. Of course, a single unit may perform some or all of the tasks or methods described herein or more than four units or processes may be used in some embodiments. Some embodiments of the invention may continuously protect data of any storage system. Although VM is mainly referred to herein, it will be understood that any storage system (e.g., hard disk) may be protected by a system and method according to some embodiments of the invention as described herein. According to some embodiments of the present invention, a fifth unit, process or method may initiate copying data from the protected storage system and may compare the data copied form the protected storage system with a replica of the same data generated from the journal and the target disk, to verify the consistency of the replicated data.

Generally, storing data in a journal and updating a target disk may be an on-going, or automatic process or operation, e.g., continuously performed in order to enable fail-over at any point in time. Using the journal and the target disk to generate, create and/or provide a copy (or replica) of a protected disk or of a part of a disk containing a chunk of data may be done based on, or in response to, a command from a user or from a consistency verification unit.

For example, in an exemplary flow according to an embodiment, a disk is protected with a 6 hours history window. In the exemplary flow, data written to a protected disk is captured, intercepted or otherwise obtained (e.g., copied from a disk after it was written thereto) and sent or provided to a unit in a recovery system (or at a recovery site). The unit writes the data to a journal. Six hours later, the data may be automatically deleted or removed from the journal and written or applied to a target disk. In order to create or provide a disk replica, image or replication (e.g., as instance containing the same data) of the protected disk for a certain point in time, e.g. one hour ago, a unit may apply to the target disk data from the start of the journal up to the write that happened one hour ago. In some embodiments, a replica of the protected disk for a certain point in time may be generated by copying data from either the target disk or the journal as will be further described herein.

Reference is made to FIG. 1, which is an overview of a system 100 and flows according to some embodiments of the present invention. FIG. 1 depicts a disaster-recovery system with consistency verification capabilities according to some embodiments of the present invention. System 100 may include, inter alia, a recovery system 150, a protected storage system 225 and a consistency verification unit 180. Recovery device or system 150 may include a protection management unit 230, a journal 110 and a target disk 120.

As shown, system 100 may include a local unit 220 that may (e.g., may be configured to) capture, intercept or otherwise obtain writes or other changes to protected storage system 225. For example, local unit 220 may copy data or content in input/output (TO) operations as, or when they occur. In another case, local unit 220 may use snapshots, e.g., periodically take a snapshot of, or scan, a protected storage system, identify changes in the protected storage system and send data and metadata to protection management unit 230 based on changes, e.g., data written after the previous snapshot may be sent to protection management unit 230. A snapshot of a protected system as referred to herein may include a list or description of data stored in the protected system at a particular point in time or during a particular time window or period. For example, a snapshot may include a list of files or blocks stored in a protected system, the size of the files, modification times of the files or blocks and so on. Accordingly, a previous and a subsequent snapshot may be used to identify changes made to a protected storage system, e.g., addition of files or data, or changes of memory blocks. Scanning a protected storage system may include listing or identifying content on the storage system. A subsequent scan may be used to identify differences made to the protected storage system, e.g., modifications of files or blocks etc. Additionally or alternatively, changes may be identified using a primitive that is provided in many storage systems which includes a list of changed blocks between two consequent snapshots, for example Changed Block Tracking (CBT) primitive. As used herein, a memory block or a block may refer to a fixed-size memory section.

Protected storage system 225 may be any applicable storage system, e.g., a disk or a virtual disk used by a VM. Any storage system may be a protected system or protected storage system 225 according to some embodiments of the invention. Generally, a protected storage system 225 as referred to herein may be any system used for storing digital information. A protected system or protected storage system 225 may be any system for which recovery system 150 as described herein maintains data and information such as metadata. It will be understood that the scope of the invention is not limited by the type of protected storage system 225. Journal 110 may include a plurality of metadata entries 112 and a plurality of content entries 114. As shown, system 100 may include or generate and provide, a time-based replica 260 of protected storage system 225. A journal as referred to herein may be, or may include, a set of digital content entries organized and stored in files, memory segments and the like. For example, as described herein, a journal may include a set of metadata entries 112 that store metadata related to writes to protected system 225 and a set of content entries 114 that include the actual data or content written to, or stored on, protected system 225. In an embodiment, journal 110 includes metadata and actual data relevant to a time period or window. For example, journal 110 may include data and metadata related to write operations performed in the last hour. According to some embodiments of the invention, actual content or data and metadata related to a time window or time period not covered by a journal may be stored in a target disk data construct (e.g., target disk data 120).

In some embodiments, local unit 220 may detect changes in protected storage system 225, for example, by intercepting write operations or by identifying changes in snapshots. Detecting changes by local unit 220 may include capturing the data (actual content) being written as well as capturing metadata. For example, metadata captured or generated by local unit 220 may include the time of the write operation (time stamp), an offset (or address) of the write, the size or length of data written or any other metadata related to the write operation or the content being written. Any metadata captured or calculated as described herein may be included in metadata entries organized and stored in files, memory segments and the like. Offsets or address in a storage device, e.g., in protected storage system 225, in journal 110 or target disk 120, may be given in any applicable manner or unit, for example in bytes, megabytes, in blocks of memory, etc.

Data captured, generated or calculated by local unit 220 may be provided to protection management unit 230. For example, local unit 220 may send or transmit captured data and captured or generated metadata to protection management unit 230. Protection management unit 230 may store (e.g., may be configured to store) captured data in a content entry 114 in journal 110 and may further insert metadata related to the write operation into one or more metadata entries 112. Protection management unit 230 may associate the metadata entry 112 with the corresponding content entry 114, e.g., by including a pointer or a reference in the metadata entry 112 to the location of the content entry 114 in journal 110. Metadata captured, calculated or generated by local unit 220 may be, for example, an address or offset to which data is written on protected storage system 225, the time the data was written, an identification of a user or application that wrote the data and so on.

Generally, a protected storage system as shown by protected storage system 225 may be any storage system, e.g., a disk or a virtual machine. A recovery system 150 may create a time based replica of a protected storage system 225, as shown by block 260. Recovery system 150 used to protect protected storage system 225 may be a distributed system, e.g., protection management unit 230 may be a unit in a first location (e.g., geographic location, building, etc.), journal 110 may be stored and maintained in a second location, and target disk data 120 may be in a third location. As described, in other embodiments, recovery system 150 may be located near (or embedded in) protected storage system 225.

When write data arrives from local unit 220, the content of the write operation may be written to a new content entry 114 in journal 110, and the information about the write may be written to a new metadata entry 112 in journal 110. According to some embodiments of the present invention, content entries 114 and metadata entries 112 may be arranged in journal 110 in segments, e.g., segments having a size of 16 MB (16 MB segments). At any time, there may be an active (e.g., available for writing) metadata segment and an active content segment. In writing a content entry 112 or a metadata entry 114 to journal 110, the content entry 112 or metadata entry 114 will be added to the current content segment or metadata segment, respectively, if there is enough space to accommodate the entry in the segment, otherwise a new segment will be allocated. A journal as referred to herein may be, or may include, a set of digital content segments, e.g., files, memory segments and the like.

In some embodiments, protection management unit 230, journal 110 and target disk 120 may be local units or elements, e.g., at the same location as protected storage system 225. For example, the same server or servers in the same data center may host protection management unit 230, journal 110 and target disk 120 and protected storage system 225. In other embodiments, components of system 100 may be distributed. For example, protected storage system 225 may be located in a data center, journal 110 and target disk 120 may be installed in a remote site, and protection management unit 230 may be included in a server on the internet. In some embodiments, consistency verification unit 180 may be a local unit or element, e.g., at the same location as protected storage system 225. For example, the same server or servers in the same data center may host consistency verification unit 180 and protected storage system 225. In other embodiments, consistency verification unit 180 may be installed in a remote site, e.g., in the same site as journal 110 and target disk 120 or may be included in a server on the internet.

According to some embodiments of the invention, data of protected storage system 225 replicated in recovery system 150 may be stored in target disk 120 and journal 110. In some embodiments, metadata entries 112 in journal 110 are stored or maintained in a first in first out (FIFO) structure as known in the art, where elements are inserted into a list or container in the order received and are further removed from the container or list according to the order inserted. For example, metadata entries related to writes (or write operations) in protected storage system 225 may be added into journal 110 according to the order, in time, of the write operations. For example, metadata entries 112 are arranged in as FIFO list or stack such that the order of writes to protected storage system 225 is maintained or reflected by the list of metadata entries 112.

In some embodiments, metadata entries 112 and content entries 114 in journal 110 only include information related to a specific history, time period or time window, and copy of data written to protected storage system 225 before that time window is stored in target disk 120. For example, if a history of 24 hours is to be stored or kept for protected storage system 225, then metadata entries 112 and content entries 114 in journal 110 may include information (metadata and actual content) related to the past or last 24 hours, and data related to writes that occurred more than 24 hours ago is stored in target disk 120.

For example, each metadata entry 112 may include the address to which data was written to protected storage system 225. For example, the address may be in the form of an offset in a virtual disk (e.g., a block or sector number). A metadata entry 112 may include the length, amount or size of data written to protected storage system 225. A metadata entry 112 may include a reference to a copy of data written to the protected system and stored in a content entry 112. For example, a metadata entry 112 may include a reference to one of content entries 114. A metadata entry 112 may include a location or identifier of the content entry 114 that stores the actual data or content written, such that using a metadata entry 112, the actual content may be found.

Target disk 120 may represent, or include, content of storage system 225. However, if the protected system has no data stored in a certain address space then the target disk may not include the empty address space. Accordingly, according to some embodiments of the invention, space required by target disk 120 may be less than the overall size of protected storage system 225.

A system and method according to some embodiments of the invention may apply data in journal 110 to target disk 120. A system and method according to some embodiments of the invention may use journal 110 and target disk 120 to create a disk replica for fail-over, e.g., failing-over of protected storage system 225 to an alternative disk or storage system. A system and method according to some embodiments of the invention may use journal 110 and target disk 120 to create disk replicas.

A system and method according to some embodiments of the invention may use a data structure referred to herein as a region-locator. A region-locator, or a plurality of region-locators, may be generated and used for applying data from journal 110 to target disk 120 and for creating a disk replica, as disclosed herein. A region-locator may be used to determine whether or not data was ever written to an offset in protected storage system 225 at a specified time and, therefore, whether or not data should be written to the corresponding offset in target disk 120. A region-locator may be used to determine, identify or locate, for each offset in protected storage system 225, the last write to the offset before a specified time as represented or included in journal 110. For example, without a region-locator described herein, in order to know or obtain the content that was last written to a particular offset, e.g., offset 0, in protected storage system 225 as stored or represented in journal 110, a unit would need to traverse all metadata entries 112 in journal 110 to find the latest write, if any, to offset 0. Using a region-locator, only once a unit needs to traverse or examine the set of metadata entries 112.

Figure 2:
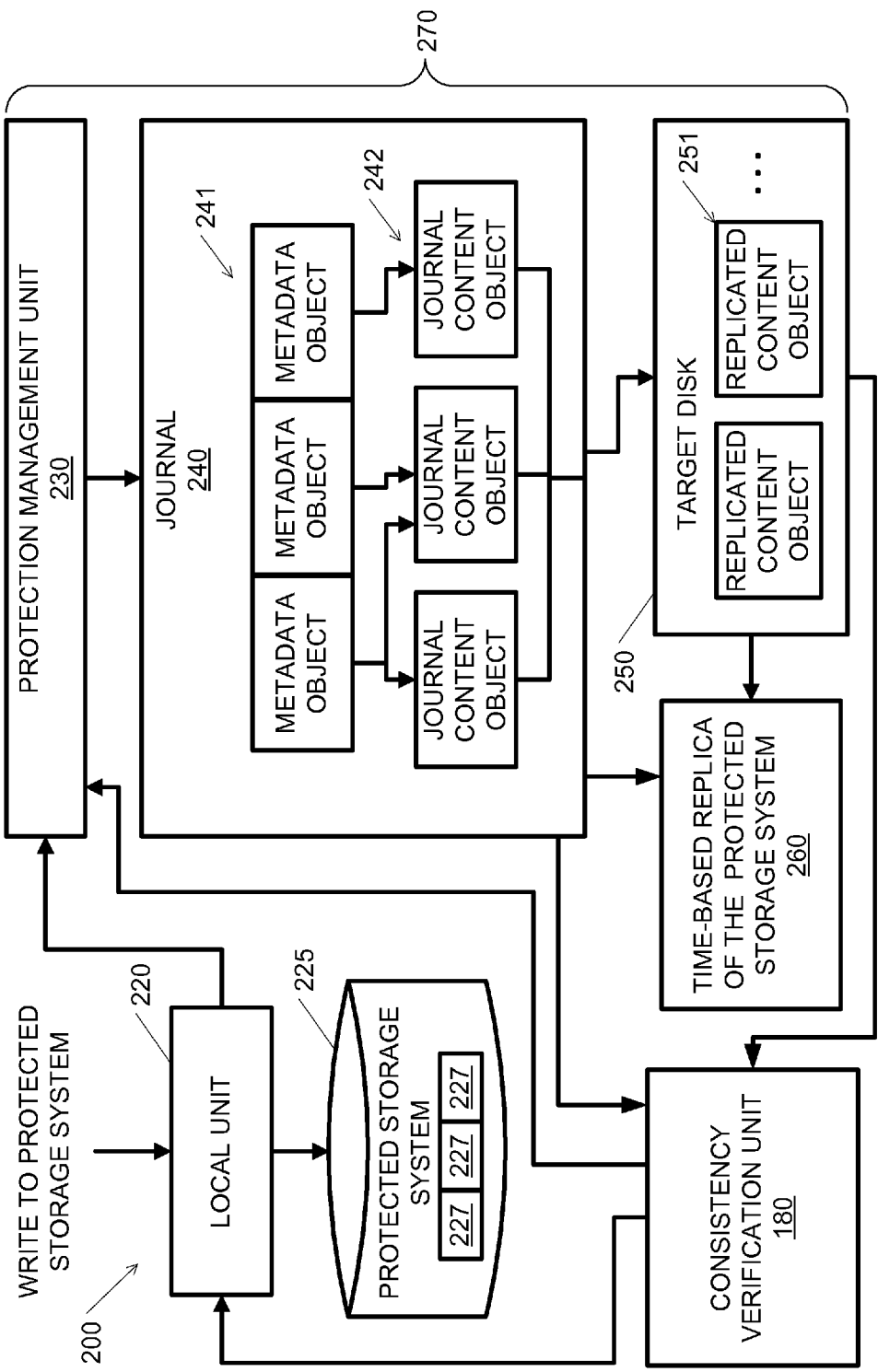
FIG. 2 is an overview of a second system according to some embodiments of the present invention.

Reference is made to FIG. 2, which is an overview of a system 200 and flows according to some embodiments of the present invention. Similar components depicted in several figures, e.g., local unit 220 and protection management unit 230 are given the same reference numerals, and will generally not be described again. FIG. 2 depicts an object based disaster-recovery system with consistency verification capabilities according to some embodiments of the present invention. System 200 may include an object-based recovery system 270, a protected storage system 225 and a consistency verification unit 180. As shown, object-based recovery system 270 may include protection management unit 230, object-based journal 240 and object-based target disk 250.

In some embodiments, protection management unit 230, journal 240 and target disk 250 may be local units or elements, e.g., at the same location protected storage system 225. For example, the same server or servers in the same data center may host protection management unit 230, journal 240 and target disk 250 and protected storage system 225. In other embodiments, components of system 200 may be distributed. For example, protected storage system 225 may be located in a data center, journal 240 and target disk 250 may be installed in a remote site and protection management unit 230 may be included in a server on the internet.

Object-based journal 240 may include one or more metadata objects 241 and one or more journal content objects 242. Object-based target disk 250 may include one or more replicated content objects 251. As further shown, object-based recovery system 270 may include or generate and provide, a time based replica of protected storage system 225. Journal 240 may include a set of metadata objects 241 configured to store the metadata entries and a set of journal content objects 242 configured to store the content entries.

Metadata objects 241 and content objects 242 described herein may be objects used in object storage techniques (e.g., object-based storage) as known in the art. For example, content objects 242 and other objects shown in FIG. 2 may be written to, or stored in, a storage system using a single command or operation. As known in the art, when using object storage technique or architecture (or object-based storage), an object cannot by modified, e.g., the way a file in a file system is modified. For example, in order to modify a portion of an object, one needs to obtain the object, modify the object, and then re-write the entire object into the object-based storage. For example, known systems and methods that use object-based storage technique for backup and disaster recovery simply store objects that include replicated data into objects. When the data to be backed up changes, known systems and methods re-write the objects. For example, an object that includes data of a protected disk is re-written every time data on the protected disk changes. Clearly, these methods and systems are inefficient since they need to re-write large amounts of data in order to reflect small changes in the protected systems.

According to some embodiments of the invention, data in journal 240 and in target disk 250 is stored in small, fixed-size objects. For example, in an embodiment, objects of 16 megabytes (MB) are used. While 16 MB objects are mainly referred to herein, it will be understood that any other size of objects may be applicable and that the scope of the invention is not limited by the size of objects used. For example, objects of 8 MB or 32 MB may be used. The size of objects used may be according to a configuration parameter or value and may be decided upon based on analyzing a protected system. For example, object size of a system may be selected based on a typical size of write operations, cost, characteristics of the object storage, storage management considerations, performance etc. Similarly, metadata objects 241 may have different size than journal content objects 242 and replicated content objects 251.

Using small object size in journal 240 and in target disk 250 enables systems and methods of the invention to limit or dramatically reduce the amount of data that is being re-written into object storage as part of writing new data to journal 240 or applying data from journal 240 to target disk 250. For example, using 16 MB content objects, adding data to journal 240 to represent a write operation to protected storage system 225 would only require writing 16 MB of data, whereas, if journal 240 was stored or kept in a single object, adding data to journal 240 to represent a single write to protected storage system 225 would necessitate re-writing the entire journal 240.

Information in journal 240 is generally divided into two categories, metadata (in metadata objects 241) and actual data or content (in content objects 242). For each write to protected storage system 225, there is, in one embodiment, a single metadata entry (e.g., metadata entry 112) with the write information, and one content or data entry (e.g., content entry 114) with content of the write. In some embodiments, metadata and a copy of actual data written to protected storage system 225 are saved on different or separate, small, fixed size, disk objects. The order of the writes is maintained in a metadata stream. For example and as shown in FIG. 2, metadata objects 241 are maintained as a stream of objects that are chained according to the order of writes to protected storage system 225. A metadata object in metadata objects 241 may include one or more metadata entries, each corresponding to a write of data to protected storage system 225. The metadata entries in each of metadata objects 241 may be ordered according to the order, in time, of the related writes to protected storage system 225. Accordingly, the chronological order of writes to protected storage system 225 is maintained by the stream of metadata objects 241 and by the metadata entries in metadata objects 241.

As described, metadata objects 241 may be objects of small size (e.g., 16 MB) and may each contain a plurality of metadata entries. For example, each metadata entry in each of metadata objects 241 may include the address to which data was written to protected storage system 225. For example, the address may be in the form of an offset in a virtual disk (e.g., a block or sector number). An entry in each of metadata objects 241 may include the length, amount or size of data written to protected storage system 225. A metadata object 241 may include a reference to a copy of data written to target disk data 250. A metadata object 241 may include a reference to a copy of data written to the protected system and stored in a content object 242. For example, a metadata object 241 may include a reference to one of content objects 242.

An entry in each of metadata objects 241 may include a location or identifier of the content object 242 that stores the actual data or content written. For example, a name of the content object 242 that stores the actual data may be included in a metadata entry in one of metadata objects 241 such that using a metadata entry in metadata objects 241, the actual content may be found.

A metadata entry in each of metadata objects 241 may include an offset in the content objects 242. For example, a content object 242 may include data corresponding to a number of write operations. For example, data written to protected storage system 225 in a first write operation may be stored at offset 0 blocks in one of content objects 242, and data written to protected storage system 225 in a second write operation may be stored at offset 12 blocks in the same content object. Accordingly, a first metadata entry, corresponding to the first write, in one of metadata objects 241 may point to offset 0 blocks in the content object included in content objects 242, and a second entry in the metadata object may point to offset 12 blocks in the same content object. A metadata entry in each of metadata objects 241 may include a timestamp that enables determining the time the write to protected storage system 225 was made.

As described, the metadata entries may be fully ordered. The objects that contain the metadata stream may be maintained as a list, and inside a metadata object the write order may match the metadata entry order. The actual content written to protected storage system 225 may be stored in content objects 242 that may be small, fixed size objects. The actual content written to protected storage system 225 and stored in content objects 242 may be pointed to from within the metadata write entries in metadata stream 241.

Figure 7:
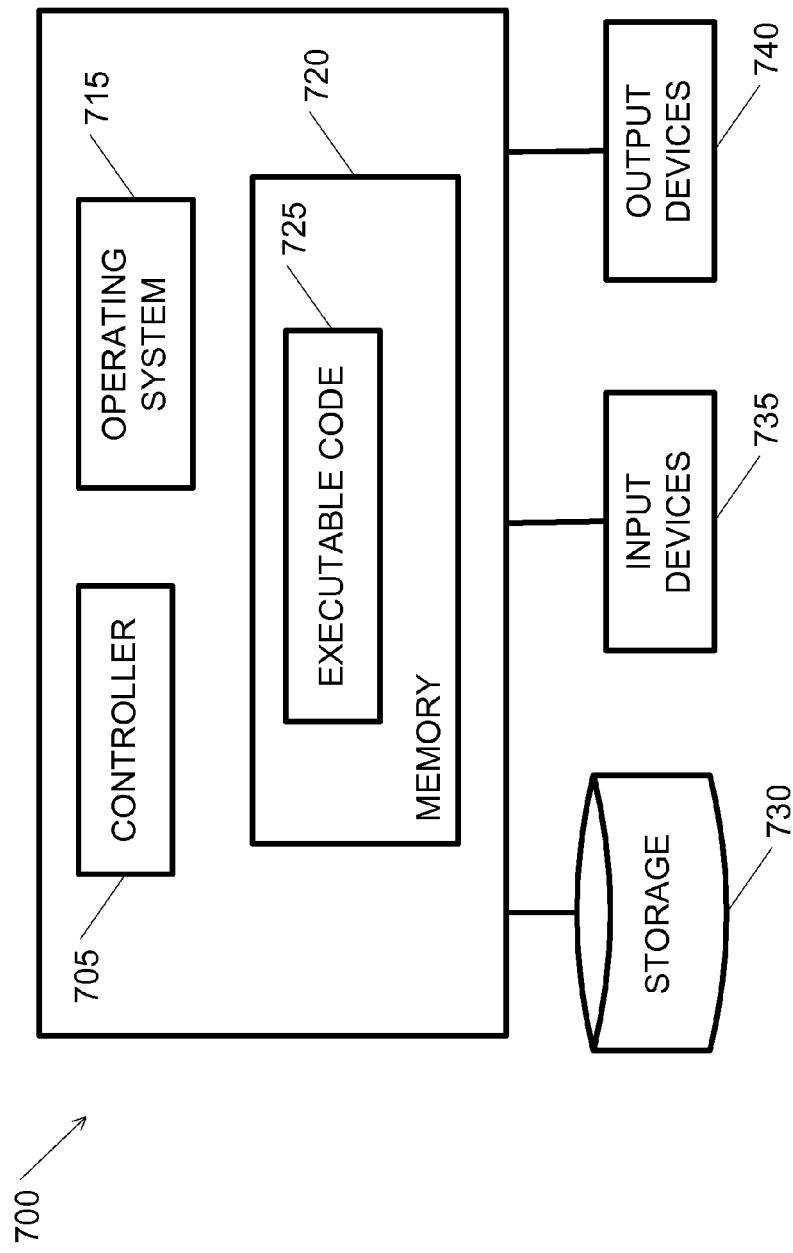
FIG. 7 shows high level block diagram of an exemplary computing device according to some embodiments of the present invention.

A flow of adding protected disk writes to journal 240 may include accumulating writes data in memory. For example, a 0.5 MB, 1 MB or 2 MB, or another size of memory chunks or segments may be allocated (e.g., controller 705 included in protection management unit 230 may allocate a segment in memory 720 or on storage 730, controller 705, memory 720 and storage 730 are depicted in FIG. 7) and data captured by local unit 220 may be stored in the memory segments. 1 MB or another size of memory chunks or segments may be allocated on any suitable storage system or device, e.g., a memory, disk, flash device, etc. According to some embodiments, the memory chunks or segments may be allocated on the object storage itself, as temporary smaller objects. When filled with data, the memory chunks or segments may be stored at one of content objects 242 in journal 240 as disclosed herein, and the memory chunks or segments may be deleted.

A method or flow may include allocating a journal content object (e.g., a journal content object in content objects 242), designating a content object 242 as the current object and writing the data from the memory segment to the content object. If the current content object cannot accommodate the copy data of the data written to protected storage system 225, e.g., because it is already closed or full, the method embodiment or flow may include allocating another content object and designating it the current content object.

The flow may further include writing information into metadata entries and setting a pointer or reference in a metadata entry such that the corresponding data or content in the content object 242 can be accessed using the metadata entry. If there is not enough space to accommodate the metadata entries of in the current metadata object, the method embodiment or flow may include allocating a new metadata object and designating it the current metadata object. For example, protection management unit 230 may always use one of metadata objects 241 as the current metadata object and one of content objects 242 as the current content object. When a metadata object is full or cannot accommodate metadata to be stored, it may be chained into the stream of metadata objects 241 and a new object may be allocated. When a content object is full or cannot accommodate content to be stored, it may be stored as shown by content objects 242 and a new content object may be allocated and designated as the current object. For the sake of clarity, the current metadata object and current content object are not shown in FIG. 2. However, these objects may be similar to objects 241 and 242 respectively.

Content objects 251 in target disk 250 may be similar to content objects 242 in journal 240, e.g., they may be small size objects, e.g., 16 MB objects that together comprise the content of protected storage system 225 which is not included in journal 240. Generally, a copy of some of the content of protected storage system 225 may be included in journal 240, and a copy of the rest of the content of protected storage system 225 may be included in target disk 250. For example, all writes in a configured time window, time or history period may be included in journal 240, and writes or updates that occurred prior to the time window or time period may be included in target disk 250.

Each of objects 251 in target disk 250 may represent, or include, content of a corresponding segment or address apace of protected storage system 225. For example, if the size of content objects 251 is 16 MB, then each content object in content objects 251 may represent, or include the content in, a corresponding 16 MB segment or address apace on protected storage system 225.

Each one of objects 251 may represent 16 MB of content of certain offset in protected storage system 225. If a 16 MB disk region in protected storage system 225 contains no data, e.g., only zeros, then there may be no corresponding 16 MB object in objects 251. For instance, starting from offset 0, the first 48 MB in a target disk may include, or be composed of, three 16 MB objects to represent (or stores the content of) the first 48 MB in the protected storage system, one for address space 0-16M, one for 16-32M and one for 32-48M. However, if the protected system has no data stored in the space 16-32M then the target disk may include only two objects for representing (or storing content of) the first 48 MB in the protected storage system. Accordingly, according to some embodiments of the invention, space required for a replica of protected storage system 225 may be less than the overall size of protected storage system 225.

A system and method according to some embodiments of the invention may apply data in journal 240 to target disk 250. A system and method according to some embodiments of the invention may use journal 240 and target disk 250 to create a disk replica for fail-over, e.g., failing-over of protected storage system 225 to an alternative disk or storage system. A system and method according to some embodiments of the invention may use journal 240 and target disk 250 to create complete or partial disk replicas.

According to some embodiments of the invention, a region-locator, or a plurality of region-locators, may be generated and used for applying data from journal 240 to target disk 250 and for creating a disk replica, as disclosed herein. A region-locator may be used to determine whether or not data was ever written to an offset in protected storage system 225 at a specified time and, therefore, whether or not data should be written to the corresponding offset in target disk 250. A region-locator may be used to determine, identify or locate, for each offset in protected storage system 225, the last write to the offset before a specified time as represented or included in journal 240. For example, without a region-locator described herein, in order to know or obtain the content that was last written to a particular offset, e.g., offset 0, in protected storage system 225 as stored or represented in journal 240, a unit would need to traverse all metadata objects 241 in journal 240 to find the latest write, if any, to offset 0. Using a region-locator, only once a unit needs to traverse or examine the set of metadata objects 241.

Additionally, the region-locator may be used to map or accumulate writes to content objects 251 in target disk 250. The region-locator may be used to determine, identify or locate, for each address space of a content object 251 all the writes to the corresponding address space in protected storage system 225 as represented or included in journal 240. For example, for a 16 MB content object that represents (or store content of) address space 0-16M, region-locator may be used to determine, identify or locate all writes to address space 0-16M in protected storage system 225 as represented or included in journal 240. According to some embodiments, if a plurality of writes has been performed to that same offset within an address space, the last write may be selected.

For example, protection management unit 230 may examine or scan metadata entries in metadata objects 241, determine, for each entry, the time and offset of the relevant write operation in journal 240, e.g., the content object in content objects 241 that stores the data written as well as an offset in the content object. Accordingly, following a single pass over metadata objects 241, a region-locator list or structure may include, or be used to locate, for each address space, all the writes to that address space, and for each offset, the last write to the offset. For example, using a region-locator structure, finding all the latest writes to address space 0-16 will not require any further traversing or examining of metadata in journal 240 since the content objects containing the writes to any offset within address space 0-16 may be readily identified by the region-locator structure. For example, a region-locator structure may include an entry for offsets in an address space and each entry in the region-locator structure may include a pointer or reference to the content object (in content objects 241) that stores the last write to the offset. As described, each one of content objects 242 may include content written to one or more offsets in one or more address spaces. An entry in a region-locator structure may further include an offset in the content object 241 such that the data or content of interest may be readily extracted from the content object.

Table 1 provides a non-limiting example of a region-locator. The first column includes the offsets of the last write operations stored in journal 240, expressed in blocks, and the second column includes in offsets in the journal, expressed in blocks.

TABLE 1

An exemplary region-locator.

| Key: address space in the protected storage (in blocks) | Location in Journal (in blocks) |
|---|---|
| Blocks 1-10 | Offset 14230 in Journal |
| Blocks 13-15 | Offset 2340 in Journal |
| Blocks 200-250 | Offset 3420 in Journal |
| Blocks 700-950 | Offset 153240 in Journal |

In the example above, blocks 1-10 and 13-15 that were mapped into the region-locator are to be found in the journal at offsets 14230 and 2340, respectively. Blocks 11-12 and 16-199, however, are to be found in target disk 250. Thus, they are not listed in the region-locator. Blocks 200-250, and 700-950, are also found in the journal, starting at offsets 3420 and 153240, respectively. For example, block 220 may be found in offset 3440 (3420+20) in the journal and block 150 may be found in offset 150 in target disk 250. The region-locator may be implemented as any data structure that allows efficiently searching based on any suitable key such as Red black tree, etc.

The advantage of using a region-locator structure as described may be understood when considering that, typically, a number of writes may be made to the same offset and a number of writes may be made to various offsets that are replicated within a single replicated content object 251. For example, different data or content may be written to offset 1-10 blocks in a possibly large number of write operations over time, or different data or content may be written to blocks at offsets 1-10 and 13-15 blocks, which may be a part of an address space of a single replicated content object 251. Without the region-locator structure, in order to derive or produce a content object that includes the up to date, or latest, content in the single content object 251, all writes to offset 1-10 blocks and to the other offsets of the address apace of the single replicated content object 251 would need to be applied separately to the content object 251. Thus, the process of obtaining, modifying and re-writing would have to be repeated for each write to offsets included within content object 251. In this example, obtaining, modifying and re-writing would have to be repeated two times, one for offset 1-10 blocks and one for offset 13-15 blocks. Using the region-locator structure as described herein, data for producing a content object that includes the latest or up to date content of all offsets of a content object may be obtained with minimal operations. Using the data in the region-locator structure, data may be read from journal content objects 242 that store the content that was written to any offset within the address space of replicated content object 251 using read operations, and written to the content object using a single write operation. Thus, a single update of the replicated content object 251 with all the up to date content that was written to any offset within the address space of content object 251, may be all that is required. A single update of a content object 251 requires obtaining, modifying and re-writing content object 251 into the object-based storage only once. This saves repeating the process of obtaining, modifying and re-writing for each write within content object 251.

Referring now to both FIG. 1 and FIG. 2, where applicable, local unit 220, protection management unit 230, consistency verification unit 180 and other components and units described herein, may be similar to, or may include components of, device 700 described herein and depicted in FIG. 7. For example, local unit 220, protection management unit 230 and consistency verification unit 180 may be, or may include, a controller 705, memory 720 and executable code 725. In some embodiments, units shown in FIGS. 1, 2 and elsewhere may be tasks or applications executed by controller 705.

A system and method according to some embodiments of the invention may apply or transfer data from journal 240 to target disk 250, or from journal 110 to target disk 120. For example, after one or more metadata entries related to a last write to one or more offsets of an address space of a content object 251 in a protected storage system are identified or detected, the associated content entries that include data written to the one or more offsets may be identified (e.g., using a reference in the metadata entries as described) and data in the content entries may be used to create and provide a replica of data stored on the protected storage system from before the time window. A replica may be produced based on any criteria. For example, writes to a specific offset or writes during a specific time period may be identified based on information in metadata entries, relevant content entries may then be identified (e.g., using references in metadata entries) and the relevant content entries in the relevant content objects may then be used to create a replica of data in the protected storage system.

According to some embodiments of the invention, applying or transferring data from journal 240, 110 to target disk 250, 120, respectively, may be performed automatically by a system (e.g., by protection management unit 230) to free data from journal 240, 110 such that journal 240, 110 is maintained at a reasonable size, or in order to maintain in journal 240, 110 data for a required history or time window or time period. For example, if a protected system (e.g., a disk) is configured for a one-hour history, a system according to some embodiments of the invention may constantly or continuously store or keep the writes in the journal 240 or 110 to be the writes in the last hour by applying older data to target disk 250 or 120, e.g., by transferring data in content objects 242 to content objects 251 in target disk 250 and removing metadata objects 241 that are no longer required from the stream of metadata objects in journal 240. In some embodiments, a system of the invention may apply older data to target disk 250 or 120 periodically, e.g., every predetermined time period. The time period for applying older data to target disk 250, 120 may be shorter than the journal time window. For example, journal 240, 110 may be configured to keep information from up to a journal time window of 24 hours, and applying older data to target disk 250, 120 may be performed every hour. Thus, every hour, information that was written to protected system 225 more than 24 hours ago may be written to or applied to target disk 250, 120.

Journal 240, 110 may be periodically purged, e.g., every 1, 10, 12 or 24 hours. According to some embodiments of the present invention, writing or applying content in journal 240 that is older than a specified time window (e.g., 10, 24, 48 hours, or any other time duration), to target disk 250, 120 may include creating a region-locator structure for the earliest write entries, e.g., the earliest 10, 12 or 24 hours, in journal 240 and then replacing the 16 MB objects in the target disk data with the new content from journal 240 according to the region locator. As described, using a region locator may ensure that each content objects 251 in target disk 250 is written at most one time.

Continuous data protection may enable a fail-over of a protected storage system to a target site. In order to achieve this, a system and method according to some embodiments of the invention may produce a replica of the protected storage system, wherein the replica is for a specified time. For example, a user may want to be provided with a replica of protected storage system 225 as it was two hours ago, or three days ago, or the user may want a replica that reflects the latest possible or available state of protected storage system 225. As described, using a region locator, a system and method according to some embodiments of the invention may identify and find the content written to protected storage system 225 based on a time value. A time value may be, or may include, a specification of a time period or a history period. For example, a time value may include a start time and an end time of a time period, thus defining a time or history window. In other cases, a time value may be an indication of a time, e.g., an hour, minute and second of a specific day. Using a time value, an embodiment of the invention may identify writes to a protected system. For example, using a time value that specifies a time window or period, all metadata entries related to writes that occurred before or during the time window may be identified as described herein. In another case, using a time value that only indicates a specific time, all metadata entries related to writes that occurred before the indicated time (or after the indicated time) may be identified. As described, using the identified metadata entries, the associated content entries may be identified or located. Accordingly, a replica of data of a protected system may be created based on any time related criteria using a time value as described.

For example, the region locator structure may be generated such that it includes references to content entries 114 and/or to content object and offsets therein such that a replica of protected storage system 225 as it was two hours ago or three days ago may be generated. Once content entries 114 and/or content objects that store data for all offsets in protected storage system 225 are obtained or referenced, protection management unit 230 may copy content entries to target disk 120, 250. Assuming protected storage system 225 is a disk, a replica of protected storage system 225 may be created by applying data from journal 240, 110 to target disk 250, 120 as described and writing data of target disk 250, 120 to a disk, e.g., a disk connected to a server or a disk in a VM pointed to by a user.

A system and method according to some embodiments of the invention may verify the consistency of replicated data in a recovery system. A system and method according to some embodiments of the invention may verify that the replicated data in recovery systems 150, 270 is identical to the original data at protected storage system 225. According to some embodiments of the present invention, consistency verification unit 180 may divide the protected storage system 225 into chunks 227. For example, chunks 227 may be of a fixed or varying size ranging from several KB to several tens of MB each. Consistency verification unit 180 may verify the consistency of each chunk 227 separately for a specified time point. For example, chunks 227 may be verified consecutively, one after the other, and returning to the first chunk after the last chunk has been verified, in a cyclic manner. According to some embodiments, consistency verification unit 180 may select chunks 227 randomly or according to a selection algorithm. For example, a selection algorithm may be based on historical or predicted usage statistics, selecting chunks in their low usage periods.

When a chunk 227 is selected, consistency verification unit 180 may signal local unit 220 to copy the data of the selected chunk 227 of the protected storage, for example, to a temporary buffer, while monitoring write operations to protected storage system 225. Consistency verification unit 180 may keep record of the time point of the copying.

Copying the data or content of the selected chunk 227 may take some time. If a write operation to the selected chunk 227 is performed by protected storage system 225 during copying, this may modify the copied content which may result in errors in the comparing stage. According to some embodiments of the present invention, consistency verification unit 180 may signal local unit 220 to monitor write operations to protected storage system 225 in order to avoid errors that may result from write operations to the selected chunk 227 during copying.

According to some embodiments, in case local unit 220 detects a write operation to selected chunk 227 during copying of the data of selected chunk 227, consistency verification unit 180 may cancel or stop verification of that chunk, discard any copied data, and mark the selected chunk 227 as unverified. Consistency verification unit 180 may retry to perform consistency verification to selected chunk 227 by initiating additional attempts immediately after the verification of the chunk is stopped (retry). Retries may be repeated for a predetermined number of consistency verification attempts. Consistency verification unit 180 may maintain a list of unverified chunks, for which all consistency verification attempts have failed. Consistency verification unit 180 may select the unverified chunks again in a later time for consistency verification.

According to some embodiments, local unit 220 may stop or halt write operations to selected chunk 227 that occur during the copying. For example, local unit 220 may discard or ignore, e.g., not perform the attempted write operations to the selected chunk 227 that occur during the copying. Typically for such failures, protected storage system 225 may generate a storage error notice, that may be sent to the operating system (OS) of protected storage system 225 or to a client application that originated the write operation, in case of a failure of the write operation. Some OS or client applications may recover from a failure of a write operation by rewriting the failed write operation. The size of chunk 227 may be selected so that copying of the chunk may last for very short period e.g., less than a few tens of millisecond (ms), and thus a very small number of attempted write operations may be discarded. However, discarding write operations to chunk 227 that occur during the copying may result in a slow response time of protected storage system 225 or even in unresolved storage errors that may adversely influence the user experience.

According to some embodiments, local unit 220 may stop or halt attempted write operations to the entire protected storage system 225 or just to the selected chunk 227 that occur during the copying, and postpone the attempted write operations to be performed after the copying is completed. For example, local unit 220 may store the attempted write operations to the entire protected storage system 225 or just to selected chunk 227 that occur during the copying in a temporary queue. In some embodiments, local unit 220 may queue attempted write operations to protected storage system 225 that occur during the copying but only after detecting a first attempted write operation to the selected chunk (including the first attempted write operation to the selected chunk). Once the copying of the selected chunk is completed, local unit 220 may write the attempted write operations that were stored in the temporary queue to protected storage system 225. Local unit 220 may send the attempted write operations that were stored in the queue to recovery system 150, 270 as well. According to this embodiment, the impact on the user may be reduced in comparison to discarding attempted write operations to the selected chunk, as it will only be perceived as a transient delay on attempted write operations rather than a storage error. Since the number of attempted write operations to a chunk during the copying is expected to be rather small, the effect of queueing attempted write operations to the selected chunk that occur during the copying on the user experience may be negligible.

Consistency verification unit 180 may generate from the recovery system 150, 270 a replica of the selected chunk from the time point of the copying. For example, a replica of the selected chunk may be generated from target disk 120, 250 and journal 110, 240, for example, as described with relation to FIG. 5. Consistency verification unit 180 may compare this replica with the copied data. For example, local unit 220 may send the copied data to consistency verification unit 180 and consistency verification unit 180 may compare the received copy with the replica of the selected chunk at recovery system 150, 270. Comparing of the copied content with the replica may be performed in any applicable manner, for example, the data may be compared bit by bit. Furthermore, signatures of the chunks, such as hash of the copied data and replica may be used for verifying that the replicated data and the copied data are identical. Thus, the copied data itself need not be sent between the protected storage system 225 and recovery sites, but only the signatures, freeing up network resources and optimizing the speed. For example, local unit 220 may generate a signature of the copied data and send the signature to consistency verification unit 180. Consistency verification unit 180 may generate a signature of the replica of the selected chunk, and compare the signature of the copied data with the signature of the replica of the selected chunk. As used herein, a signature or fingerprint may refer to a bit string, typically much shorter than the original data item, which identifies the original data item uniquely or substantially uniquely. A signature of a data item may be calculated using an appropriate signature or fingerprinting algorithm. An appropriate signature algorithm may be chosen such that the probability of two files yielding the same signature may be negligible.

The task of generation of a chunk replica may be divided between consistency verification unit 180, and protection management unit 230 according to any applicable manner. Either one of consistency verification unit 180 and protection management unit 230 may generate the region locator, and either one of consistency verification unit 180 and protection management unit 230 may use the region locator to request data from either journal 110, 240 or target disk 120, 250. Additionally, either one of consistency verification unit 180 and protection management unit 230 may combine the obtained data to produce a replica of the selected chunk from the specified time point. For example, consistency verification unit 180 may generate a region locator and copy data from content entries in journal 110, 240 for the offsets in the list of the region locator and copy data from target disk for other offsets 120, 250. Additionally, it should be noted that some embodiments of the present invention are not limited to generating the complete or partial replica using the region locator. While combining the data from the journal and target disk using the region locator is very efficient, other methods may be used, including, for example, the trivial and less efficient method of copying the target disk in its entirety, and overwriting or updating this copy with the data in the journal until the specified time point.

According to some embodiments of the present invention, a single, constantly updated, region-locator, referred to herein as persistent region-locator, may be used for the verification of substantially all chunks, eliminating the need to create a region-locator each time a chunk is being verified. For example, a region-locator may be generated as disclosed herein, e.g., for the consistency verification of the first chunk. The region-locator may be updated for each subsequent chunk verification to the time point in which the currently verified chunk was copied at the protected storage device. For example, new write operations that occurred after the previous chunk was copied and before the current chunk was copied may be added into the persistent region-locator, and write operations that were applied to the target disk may be removed from the persistent region-locator. Hence, when the current chunk is verified, the persistent region-locator together with the journal 110, 240 and target disk 120, 250 may represent the state of the currently verified chunk at the time point in which it was copied at the protected storage device and may be used for the current chunk verification. Applied write operations may be removed from the persistent region-locator after each write operation that is moved or applied from journal 110, 240 to target disk 120, 250, or after a set of write operations that are moved or applied from journal 110, 240 to target disk 120, 250. New write operations may be added to the persistent region-locator after each new write operation is added to journal 110, 240, or after adding a set of new write operations to journal 110, 240. Constantly or periodically updating the region-locator may eliminate the need to traverse the entire journal 110, 240 and build a new region-locator for the verification of each chunk.

According to some embodiments of the present invention, the persistent region-locator may be updated as a preparation step for performing consistency verification of a current chunk. Applied write operations may be removed from the persistent region-locator, and new write operations that occurred after the previous chunk was copied and before the current chunk was copied may be added to the persistent region-locator. New write operations may be updated into the region-locator just before generating a replica of the currently verified chunk, by traversing metadata entries in journal 110, 240 once for write operations that occurred after the previous chunk was copied and before the current chunk was copied at the protected storage system, and updating those write operations into the persistent region-locator. The time of the write operation may be determined from the timestamp included in the metadata entries.

According to some embodiments of the present invention, data stored in recovery system 150, 270 may be amended according to the data of the copied chunk. If signatures are used, data stored in recovery system 150, 270 may be amended to some extent if the signature includes error detection and correction codes. Additionally or alternatively, if signatures are used and an error is detected during consistency verification of a chunk, recovery system 150, 270 may request protected storage system 225 to resend the corrupted chunk, and the entire chunk may be resent from protected storage system 225 to recovery system 150, 270 and stored in recovery system 150, 270 instead of the corrupted chunk. It should be readily understood that, in case a corrupted chunk is resent and stored in recovery system 150, 270, no history of that corrupted chunk may be available.

Figure 3:
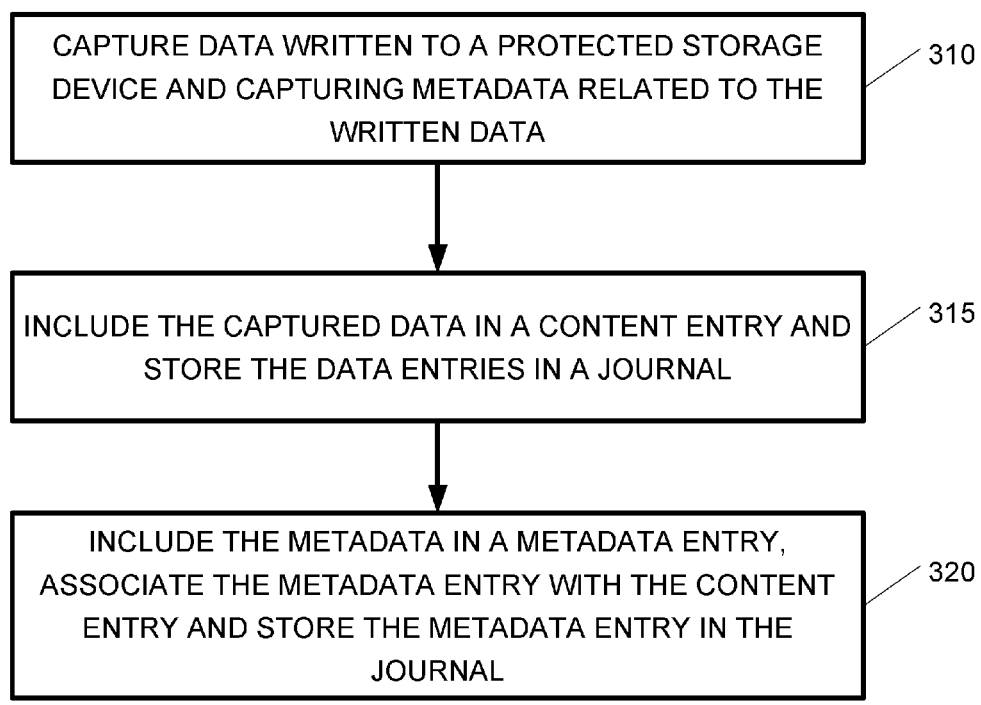
FIG. 3 shows a flowchart of a method for journaling in a recovery system according to some embodiments of the present invention.

Reference is now made to FIG. 3, showing a flowchart of a method for journaling in a recovery system according to an embodiment of the present invention. As shown by block 310, data written to a protected storage system (e.g., protected storage system 225) may be captured and metadata related to the written data may be captured. For example, changes in the protected storage system, may be detected, for example by intercepting write operations, and data written to, or stored on, the protected storage system may be captured. As described, metadata related to a write of data, may be captured, generated or identified e.g., an offset to which data is written on the protected storage system, a time of the write operation and the length or amount of data written may captured or determined.

As shown by block 315, the captured data may be included or stored in a content entry in a journal, or in journal content object in an object-based journal (such as object-based journal 240). If the recovery system is object-based (e.g., recovery system 270), the content entry is stored in one or more fixed-size content objects and the content objects may be stored in the journal using object-based storage technique. For example, a local unit may detect changes in the protected storage system, for example by intercepting writes to a protected storage system (e.g., writes to a physical disk or writes to a virtual disk in a VM) in a first site and may send captured data and related metadata to a protection management unit (such as protection management unit 230) in a second, possibly remote or separate, site. As described herein, the protection management unit may insert the captured data, as a content entry, into fixed size, small content objects and store the content objects in a journal in an object-based storage system using object-based storage technique. For example, a commercial object-based storage system or platform (e.g., S3 provided by Amazon) may be used to store content objects in a journal. The flow of adding protected disk writes to the journal may include accumulating writes data or content entries in memory, for example, in e.g., 0.5 MB, 1 MB or 2 MB memory chunks or segments, and storing the memory chunks or segments as content objects in a journal in an object-based storage system using object-based storage technique.

According to some embodiments of the invention, information related to writing data to a protected system may be stored or recorded in a recovery system. The information stored may include the actual data written to the protected system (e.g., in content entries as shown by block 315 and described herein) and metadata related to the writing or storing of the actual data. For example, metadata (e.g., time, offset and the like) may be stored in metadata entries and/or in metadata objects as shown by block 320.

As shown by block 320, the metadata may be included or stored in metadata entries. If the recovery system is object based (e.g., recovery system 270), the metadata entries may be stored in one or more fixed-size metadata objects and the metadata objects may be stored in an object-based journal using object-based storage technique. The metadata entries may be associated with the content entries. Object-based storage techniques may be used to store the metadata object in the journal. Fixed-size objects used with object-based storage techniques are known in the art. Fixed-size objects may be a memory construct or may be objects or constructs stored on a disk or other storage media. For example, a set of fixed-size objects may be a set of objects (e.g., files or memory segments) where each of the objects has the same size. For example, as opposed to files that may be of any size, fixed-size objects are objects that, regardless of the amount data they contain, have a fixed size. For example, the size of a fixed size object stored in a disk or other storage system may be 16 MB even if the objects only contain 2 MB of data. Fixed-size objects are used by object based systems as known in the art. Using fixed size objects relieves a system from tracking or otherwise dealing with the size of objects being stored, read or otherwise manipulated. A system using fixed-size objects (e.g., object based systems known in the art) may provide basic, simple (also referred to in the art as atomic) operations such as read, write or delete objects without dealing with the size of the objects. In contrast, variable size objects (e.g., files known in the art) may have variable size, e.g., a file may be extended in size as more data is added to the file.

For example, the protection management unit may include metadata in metadata objects in the journal where the metadata objects are objects of fixed, small size, e.g., objects that are each 0.5 MB, 1 MB or 2 MB in size, or (as with other parameters discussed herein) other sizes. The protection management unit may include a copy of actual data written to the protected storage system in fixed-size content objects, e.g., objects that are each 16 MB in size.

Metadata entries, such as metadata entries 112 or metadata entries in metadata object 241 may be associated with content entries or with content entries in content objects 242, such that each metadata entry for a write operation is associated with the actual data or content entry that was stored on the protected storage as part of the write operation. For example, pointers as known in the art may be used to associate or link a metadata entry with a content entry. In other cases, a reference (e.g., a name or address) of content entry may be included in metadata entries thus associating metadata entries with content entries, enabling identifying content entries associated with a metadata entry based on a reference included in the metadata entry. In yet other cases, a list may be used whereby, for each metadata entry, an entry in the list indicates the content entry associated with the metadata entry.

Figure 4:
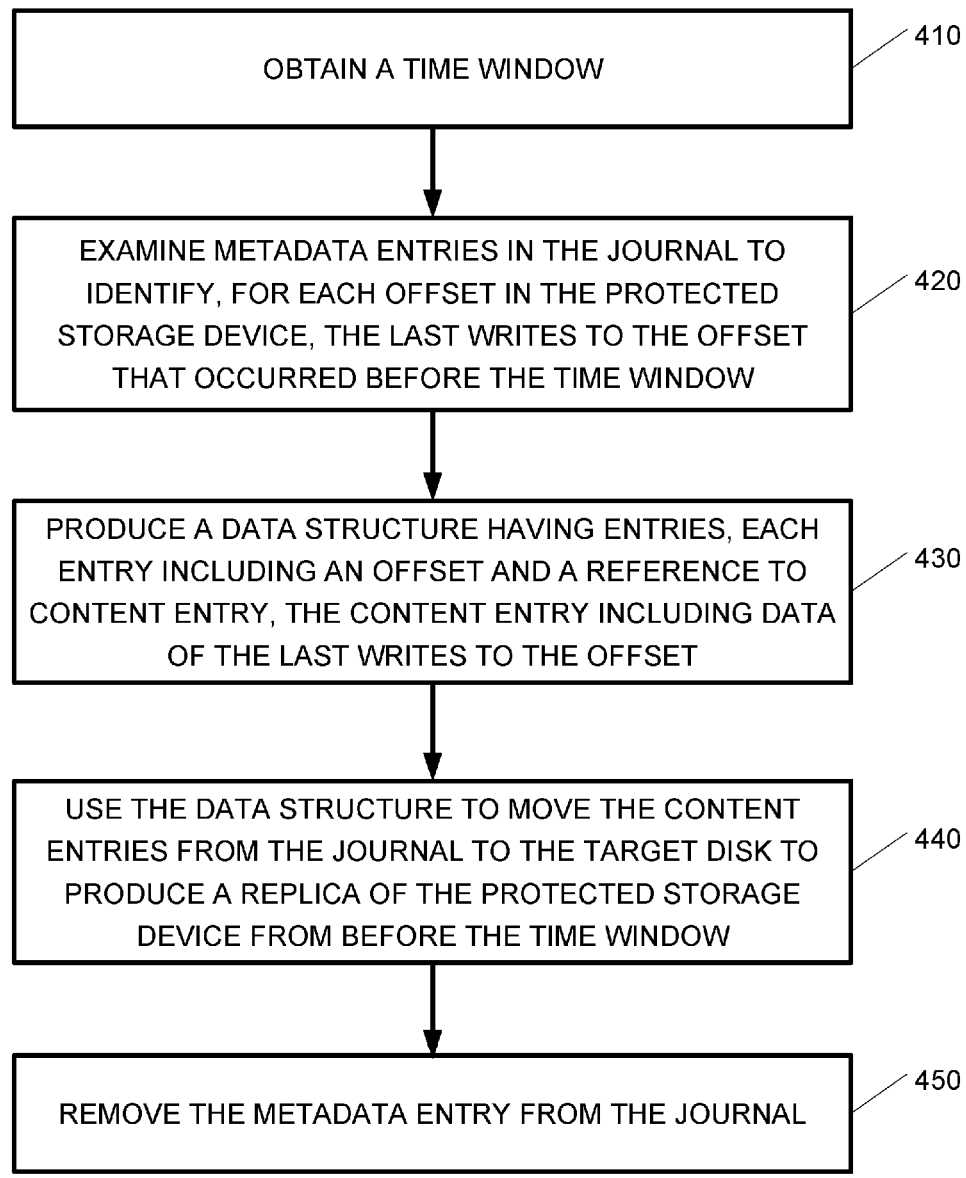
FIG. 4 shows a flowchart of a method for applying the journal to the target disk according to some embodiments of the present invention.

Reference is now made to FIG. 4, which shows a flowchart of a method for applying a journal to a target disk in a recovery system according to some embodiments of the present invention. Applying data from a journal, such as journal 110, 240 to a target disk such as target disk 120, 250 may be performed continuously or periodically, according to the system design, for example, every 10, 12 or 24 hours, or another time period.

As shown by block 410, a time window, history parameter or time period value may be obtained. According to some embodiments, the time window may be one of the system parameters that may be determined or entered, for example, by a system operator. According to some embodiments of the invention, the journal may be configured to store all writes to a protected system performed during a recent time period, defined by the time window. For example, the time window may indicate that the journal is to maintain data for the past 24 hours. According to some embodiments, the time window may be used to detect, in the journal, a metadata entry related to a write performed before the time window. Since metadata entries may be chronologically arranged, e.g., in the form of a stream according to time, detecting metadata entries related to writes performed before the time window may include traversing the stream of metadata entries and identifying the last write that occurred before the time window. For example, if a time window of 24 hours is defined than the last write to a protected storage system (e.g., protected storage device 225) that is outside the time window may be one that occurred 24 hours and two seconds ago. Once the last write before the time or history window is identified, all writes that occurred before that write may be considered as old or outside the time or history window.

As shown by block 420, metadata entries in the journal may be examined to identify, for offsets in the protected storage device, the last write to the offset that occurred before the time window. As described, metadata entries in the journal may include an offset in the protected storage system that may serve as an address of a content entry storing the related write. All metadata entries in the journal may be scanned, and the last write to the offset for each offset that data was written to before the time window may be identified.

For example, upon finding a first metadata entry related to a write to offset 0 that occurred before the indicated time, the protected storage system may record or mark the first metadata entry as the last write to the offset that occurred before the time window. If, continuing to examine metadata entries in the journal, a second metadata entry related to a more recent write to offset 0 that also occurred before the time window is found, the second entry may be recorded or marked as the last write to offset 0 that occurred before the time window. Accordingly, following a single pass over all metadata entries from before that time window, the metadata entry related to the most recent or last write to offset 0 that occurred before the time window may be found. In a similar way, the last write to each offset in a protected storage system that occurred before the time window may be found in a single pass over metadata in the journal. Accordingly, by traversing once the stream of metadata entries in the journal, a system and method according to some embodiments of the invention may produce a list of structure that includes, for offsets or addresses in the protected storage system, the last write of data that took place before or up to the specified or indicated time window.

As shown by block 430, a data structure, also referred to herein as the region-locator, having a list of entries may be produced, each entry including an offset and a reference to a content entry (e.g., content entry 114 or a content entry in a content object 242), the content entry including data of the last write to the offset. For example, following a single pass over a set of metadata entries in journal 110, 240, the relevant metadata entries may be identified. As described, metadata entries may include a reference or pointer to the relevant content entries. Accordingly, provided with metadata entries as described, a region-locator structure as described herein that may include, a list of offsets and for each offset in the list, a reference to the content entries containing the last content or data that was written to the offset before the specified or indicated time, may be generated.

Additionally, and mainly for but not limited to an object based recovery system, the region-locator may be used to map or accumulate writes to specific content objects in the target disk. The region-locator may indicate, for each address space of a content object all last writes to the corresponding address space in the protected storage system from before the time window, as represented or included in the journal. For example, following a single pass over a set of metadata entries in the metadata objects, the relevant metadata entries of each address space of each content object from before the time window may be identified. For example, for a 16 MB content object that represents (or store content of) address space 0-16M, the region-locator may provide indication of all writes to address space 0-16M in the protected storage system from before the time window as represented or included in the journal. If a plurality of writes has been performed to the same offset within an address space before the time window, the last write will be selected.

As shown by block 440, the region-locator may be used to move content entries from the journal to the target disk to produce a replica of the protected storage system according to the time window. For example, if an embodiment of the system initiates applying of writes from before the time window to the target disk, then the region-locator as described herein may be generated such that it includes metadata entries related to the most recent writes to the protected storage system that occurred before the time window. Using metadata entries listed in the region-locator, corresponding content entries may be copied or applied to the target disk.

In some embodiments, mainly but not limited to object based recovery system, the region-locator may include indications to the most recent writes to each address space of each content object from before the time window. Thus, the region-locator may be used to determine, identify or locate the most recent writes to each address space before the time window corresponding to each content object. Using the metadata entries in the region-locator, the content entries in the content objects of each address space may be copied or applied to a corresponding content object in the target disk, possibly updating each content object 251 no more than once.

As shown by block 450, content entries and metadata entries that were applied to the target disk may be removed from the journal. For example, after the actual data written in an operation and included in a content entry is moved or copied to the target disk, the content entry and the related metadata entry may be deleted or removed from the journal, e.g., by removing the content entry from content objects and the metadata entry from metadata objects. Accordingly, a journal may be maintained such that it includes data and metadata related to a configured time window.

Figure 5:
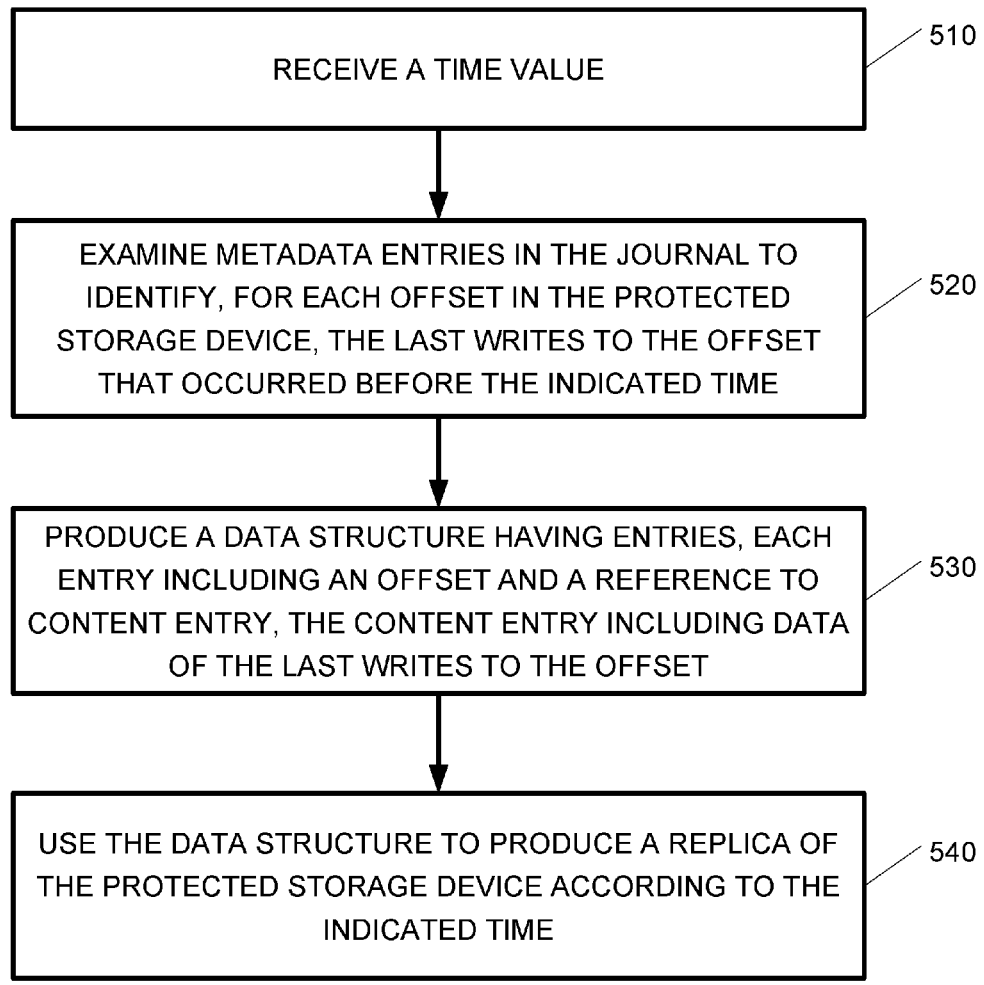
FIG. 5 shows a flowchart of a method for creating a complete or partial disk replica from the journal and the target disk according to some embodiments of the present invention.

Reference is now made to FIG. 5, which shows a flowchart of a method for creating a complete or partial disk replica from a journal and a target disk in a recovery system, e.g., recovery systems 150, 270, according to embodiments of the present invention.

As shown by block 510, a time value or time stamp may be received. For example, a system and method according to some embodiments of the invention may receive a time value that indicates a time and date for which a replica of a protected storage system (e.g., protected storage system 225) is to be provided. For example, a user or a consistency verification unit, such as consistency verification unit 180 may want a replica of a part, e.g., a chunk, or of all protected storage system as it was five minutes ago, two days ago, or to be provided the most recent or current replica of the protected storage system.

As shown by block 520, metadata entries in the journal may be examined to identify, for each offset in the protected storage system, the last write to the offset that occurred before the indicated time. As described, metadata entries in journal may include an offset that may serve as an address of the related content entry of the write operation. Metadata entries in journal may be scanned and, for each offset, the last write to the offset before the indicated time may be identified. In case a replica of a selected chunk is required, Metadata entries in journal may be scanned and, for each offset in the selected chunk, the last write to the offset before the indicated time may be identified.

For example, upon finding a first metadata entry related to a write to offset 0 that occurred before the indicated time, the first metadata entry may be recorded or marked as the last write to the offset that occurred before the indicated time. If, continuing to examine metadata entries in the journal, a second metadata entry related to a more recent write to offset 0 that also occurred before the indicated time is found, the second entry may be recorded as the last write to offset 0 that occurred before the indicated time. Accordingly, following a single pass over all metadata entries, the metadata entry related to the most recent or last write to offset 0 that occurred before an indicated time or date may be found. In a similar way, the last write to each offset in a protected storage system that occurred before the indicated time may be found in a single pass over metadata in the journal. Accordingly, by traversing once the stream of metadata entries in the journal, a system and method according to embodiments of the invention may produce a list or structure that includes, for each offset or address in protected storage system or in the selected chunk, the last write of data that took place before or up to a specified or indicated time or date.

As shown by block 530, a region-locator having a list of entries may be produced, each entry including an offset and a reference to a content entry including data of the last write to the offset before the indicated time. For example, following a single pass over a set of metadata entries, the relevant metadata entries may be identified. As described, metadata entries may include a reference or pointer to the relevant content entries. Accordingly, provided with metadata entries as described, a region locator structure as described herein may be generated. The region locator may include a list of offsets and for each offset in the list, a reference to the content entries containing the last content or data that was written to the offset before the specified or indicated time.

As shown by block 540, the data structure may be used to produce a replica 260 of the protected storage system according to the time value or time stamp, or to produce a replica of the selected chunk according to the time value or time stamp. For example, if a user or backup application requests a replica of a protected storage system as it was five hours ago, then the region-locator as described herein may be generated such that it includes metadata entries related to the most recent writes to the protected storage system that occurred up to, but not later than, five hours ago. Similarly, if a user or a consistency verification unit requests a replica of a selected chunk as it was five minutes ago, then a region-locator as described herein may be generated such that it includes metadata entries related to the most recent writes to the selected chunk that occurred up to, but not later than, five minutes ago.

According to some embodiments of the present invention, a replica of the protected storage system or of the selected chunk, according to the indicated time, may be generated substantially without altering or updating the target disk. For example, the replica may be generated by using the entries in the region-locator for copying data from either the target disk or the journal, as indicated in the region-locator, e.g., by copying data from content entries in journal for the offsets included in the list of the region locator, and copying data from the target disk for other offsets. For example, the replica may be created as a single, possibly very large, object in the object storage, or elsewhere. For example, the replica may be created on block storage where it may be mounted as an actual disk, e.g., Elastic Block Store (EBS®) in AMAZON®.

Figure 6:
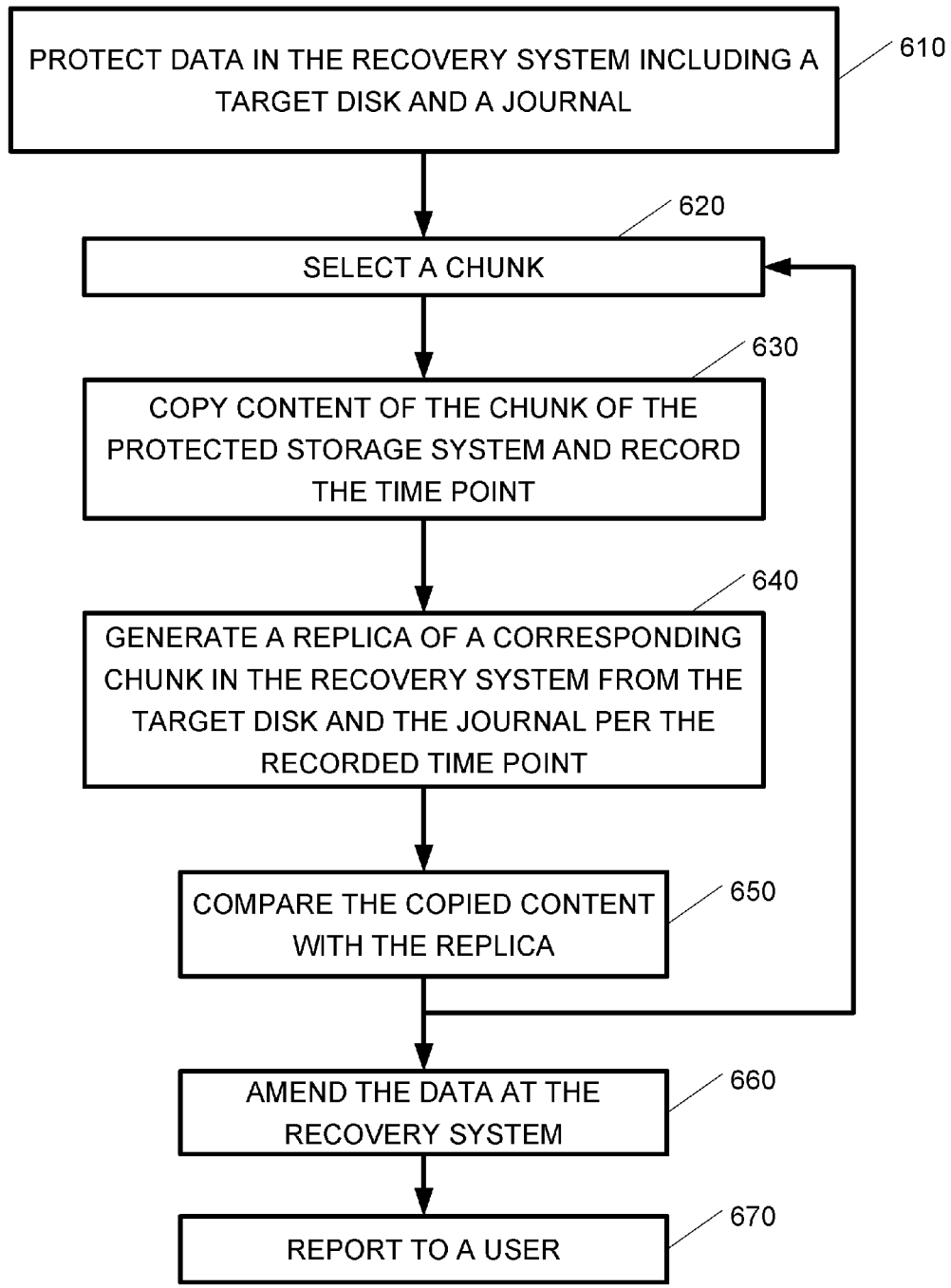
FIG. 6 shows a flowchart of a method for verifying consistency of the replicated data in a recovery system according to some embodiments of the present invention.

Reference is now made to FIG. 6, which shows a flowchart of a method for verifying consistency of recovery data in a recovery system, according to some embodiments of the present invention. The method presented in FIG. 6 may be performed, for example, by systems 100 and 200 depicted in FIGS. 1 and 2, respectively.

In operation 610 data or content of a protected storage system, such as system 225, may be protected in a recovery system, such as recovery system 270 or 150. In operation 620, a chunk of the protected storage system is selected. According to some embodiments, chunks may be selected for verification consecutively, one after the other, and returning to the first chunk after the last chunk has been verified, in a cyclic manner. According to some embodiments, chunks may be selected randomly or according to a selection algorithm. For example, a selection algorithm may be based on historical or predicted usage statistics, selecting chunk in their low usage periods.

In operation 630, the current time point is recorded, and the data of the selected chunk of the protected storage is copied, for example, to a temporary buffer, while monitoring write operations to the protected system. Copying the data of the selected chunk may take some time. If a write operation to the chunk is performed during copying, this may modify the copied data which may result in errors in the comparing stage. According to some embodiments of the present invention, avoiding errors that result from write operations to the chunk during copying may require monitoring write operations to the protected system, and specifically to the selected chunk, during the time of copying.

According to some embodiments, if a write operation to the selected chunk is detected while copying the data of the selected chunk, verification of that chunk may be canceled or stopped, the copied data, if any, may be discarded, and the selected chunk may be marked as unverified. An additional attempt to verify the consistency of the chunk may be initiated immediately after the verification is stopped (retry). Retries may be repeated for a predetermined number of consistency verification attempts. A list of unverified chunks, for which all consistency verification attempts have failed, may be maintained, and the unverified chunks may be selected again in a later time for consistency verification.

According to some embodiments, write operations to the selected chunk that occur during the copying may be stopped or halted. For example, the attempted write operations to the selected chunk that occur during the copying may be discarded or ignored, e.g., not performed. Typically, these failures of a write operation may result in a storage error notice to the operating system (OS) or to the client application that originated the write operation. Some OS or client applications may recover from a failure of a write operation by rewriting the failed write operation. The size of the chunk may be selected so that copying of the chunk may last for very short period less than a few tens of milliseconds (ms), and thus a very small number of attempted write operations may be discarded. However, discarding write operations to the chunk during the copying may result in a slow response time of the protected storage system or even in unresolved storage errors that may adversely influence the user experience.

According to some embodiments, attempted write operations to the entire protected storage system or just to the selected chunk that occur during the copying may be stopped or halted, and postponed to be performed after the copying is completed. For example, attempted write operations to the entire protected storage system or just to the selected chunk during the copying may be stored in a temporary queue. In some embodiments, attempted write operations to the protected storage system, that occur during the copying but only after a first attempted write operation to the selected chunk is detected, are stored in the queue (including the first attempted write operation to the selected chunk). Once the copying of the selected chunk is completed, the attempted write operations that were stored in the temporary queue may be written to the protected storage system. The attempted write operations that were stored in the queue may be sent to the recovery system as well.

In operation 640, a replica of a chunk in the recovery system that corresponds to the copied chunk, at the recorded time point of the copying, may be generated from the target disk and the journal. For example, a replica of the chunk may be generated from the target disk and the journal, for example, as described with relation to FIG. 5. In operation 650, the copied data may be compared with the replica. For example, the copied data may be sent to the recovery system and compared with the replica of the selected chunk at the recovery system. In some embodiments, the replica of the chunk may be sent to the protected system and compared with the copied data at the protected system. Comparing of the copied data with the replica may be performed in any applicable manner, for example, the data may be compared bit by bit. Alternatively, signatures of the copied data and the replica may be generated at both sides so that only the signature may be transmitted between the sites and compared.

Operations 620, 630, 640 and 650 may be repeated for a plurality of chunks. For example, operations 620, 630, 640 and 650 may be repeated for substantially all chunks of the protected storage system in a cyclic manner. In optional operation 660, data stored in the recovery system may be amended according to the data of the copied chunk. If signatures are used, data stored in the recovery system may be amended to some extent if the signature includes error detection and correction codes. Additionally or alternatively, if signatures are used and an error is detected during consistency verification of a chunk, the entire chunk may be resent from the protected storage system to the recovery system and saved in the recovery system instead of the corrupted chunk. In operation 670 the results of the comparison, as well as corrected errors may be reported to a user.

Reference is made to FIG. 7, showing a high level block diagram of an exemplary computing device according to some embodiments of the present invention. Computing device 700 may include a controller 705 that may be, for example, a central processing unit processor (CPU), a chip or any suitable computing or computational device, an operating system 715, a memory 720, executable code 725, storage or storage device 730, input devices 735 and output devices 740. Controller 705 may be configured to carry out methods described herein, and/or to execute or act as the various modules, units, etc., for example by executing code or software. More than one computing device 700 may be included, and one or more computing devices 700 may act as the various components, for example the components shown in FIGS. 1 and 2. For example, protection management unit 230 and consistency verification unit 180 described herein may be, or may include components of, computing device 700. For example, by executing executable code 725 stored in memory 720, controller 705 may be configured to carry out a method of protecting data of a virtual machine as described herein. Controller 705 may be configured to generate a region-locator structure and use the region-locator structure to provide a replica of a protected storage system as described herein. Controller 705 may be configured to generate backups of a protected storage system from a disaster recovery system as described herein, and store the backups on storage device 730.

Operating system 715 may be or may include any code segment (e.g., one similar to executable code 725 described herein) designed and/or configured to perform tasks involving coordination, scheduling, arbitration, supervising, controlling or otherwise managing operation of computing device 700, for example, scheduling execution of software programs or enabling software programs or other modules or units to communicate. Operating system 715 may be a commercial operating system.

Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 720 may be or may include a plurality of, possibly different memory units. Memory 720 may be a computer or processor non-transitory readable medium, or a computer non-transitory storage medium, e.g., a RAM.

Executable code 725 may be any executable code, e.g., an application, a program, a process, task or script. Executable code 725 may be executed by controller 705 possibly under control of operating system 715. For example, executable code 725 may be an application that generates backups of a storage system from a disaster recovery system as further described herein. Although, for the sake of clarity, a single item of executable code 725 is shown in FIG. 7, a system according to embodiments of the invention may include a plurality of executable code segments similar to executable code 725 that may be loaded into memory 720 and cause controller 705 to carry out methods described herein. For example, units or modules described herein may be, or may include, controller 705 and executable code 725.

Storage device 730 may be any applicable storage system, e.g., a disk or a virtual disk used by a VM. Storage 730 may be or may include, for example, a hard disk drive, a floppy disk drive, a Compact Disk (CD) drive, a CD-Recordable (CD-R) drive, a Blu-ray disk (BD), a universal serial bus (USB) device or other suitable removable and/or fixed storage unit. Content or data may be stored in storage 730 and may be loaded from storage 730 into memory 720 where it may be processed by controller 705. In some embodiments, storage device 730 may be used for storing backups of a protected storage system. In some embodiments, some of the components shown in FIG. 7 may be omitted. For example, memory 720 may be a non-volatile memory having the storage capacity of storage 730. Accordingly, although shown as a separate component, storage 730 may be embedded or included in memory 720.

Input devices 735 may be or may include a mouse, a keyboard, a touch screen or pad or any suitable input device. It will be recognized that any suitable number of input devices may be operatively connected to computing device 700 as shown by block 735. Output devices 740 may include one or more displays or monitors, speakers and/or any other suitable output devices. It will be recognized that any suitable number of output devices may be operatively connected to computing device 700 as shown by block 740. Any applicable input/output (I/O) devices may be connected to computing device 700 as shown by input devices 735 and output devices 740. For example, a wired or wireless network interface card (NIC), a printer, a universal serial bus (USB) device or external hard drive may be included in input devices 735 and/or output devices 740.

Some embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 720, computer-executable instructions such as executable code 725 and a controller such as controller 705.

The storage medium may include, but is not limited to, any type of disk including, semiconductor devices such as read-only memories (ROMs) and/or random access memories (RAMs), flash memories, electrically erasable programmable read-only memories (EEPROMs) or any type of media suitable for storing electronic instructions, including programmable storage devices. For example, in some embodiments, memory 720 is a non-transitory machine-readable medium.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system according to some embodiments of the invention may additionally include other suitable hardware components and/or software components. In some embodiments, a system may include or may be, for example, a personal computer, a desktop computer, a laptop computer, a workstation, a server computer, a network device, or any other suitable computing device. For example, a system according to some embodiments of the invention as described herein may include one or more devices such as computing device 700.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and some embodiments not specifically described may include various features described herein.

The invention claimed is:

1. A computer-implemented method of verifying consistency of data in a recovery system, the method comprising:
   protecting data in the recovery system, wherein the recovery system comprises a target disk configured to store a replica of a protected storage system from before a time window and a journal comprising data and metadata of write operations to the protected storage system that occurred during the time window;
   verifying consistency of the replicated data, concurrently with the protecting by:
      copying data of a selected chunk of the protected storage system at a specified time point, while monitoring write operations to the protected system;
      generating a replica of the selected chunk in the recovery system from the target disk and the journal, from the specified time point;
      comparing the copied data of the selected chunk with the replica of the selected chunk;
      repeating the copying, generating and comparing for a plurality of chunks; and
   reporting results of the comparison to a user.

2. The method of claim 1, further comprising:
   repeating the verifying for substantially all chunks of the protected storage system in a cyclic manner.

3. The method of claim 1, wherein comparing the copied data with the replica is performed bit by bit.

4. The method of claim 1, further comprising amending data stored in the recovery system according to the data of the copied chunk.

5. The method of claim 1, wherein verifying further comprises:
generating a signature of the copied data;
generating a signature of the replica,
wherein comparing the copied data with the replica is performed by comparing the signature of the copied data with the signature of the replica.

6. The method of claim 1, wherein attempted write operations to the selected chunk that occur during the copying are discarded.

7. The method of claim 1, wherein attempted write operations to the selected chunk that occur during the copying are stored in a queue and performed after the copying is completed.

8. The method of claim 1, wherein attempted write operations to the protected storage system that occur during the copying are stored in a queue and performed after the copying is completed.

9. The method of claim 1, wherein attempted write operations to the protected storage system during the copying, that occur after an attempted write operation to the selected chunk is detected, are stored in a queue and performed after the copying is completed.

10. The method of claim 1, wherein verifying of the selected chunk is stopped if a write operation to the selected chunk is detected.

11. The method of claim 1, wherein the recovery system is an object-based recovery system.

12. The method of claim 1, wherein generating the replica comprises:
requesting from the recovery system data of the selected chunk from the journal and target disk, from the specified time point; and
combining the obtained data to produce the replica of the selected chunk from the specified time point.

13. The method of claim 1, wherein protecting the data in the recovery system comprises:
storing, in the target disk, the replica of the protected storage system from before the time window;
obtaining information related to a write operation in the protected storage system, the information including:
copy of data stored on the protected storage system, and
metadata related to the stored data;
maintaining the journal by:
storing a copy of the stored data in a content entry;
storing at least a portion of the metadata in a metadata entry; and
associating the metadata entry with the content entry; and
periodically applying data received before a predetermined time window from the journal to the target disk.

14. The method of claim 13, further comprising:
generating a persistent region-locator, wherein the persistent region-locator includes a list of offsets and, for an offset in the list, a reference to a content entry that includes data of the last write to the offset;
wherein generating the replica comprises:
updating the persistent region-locator to the specified time point by:
removing applied write operations from the persistent region-locator; and
adding new write operations that occurred after the previous chunk was copied and before the selected chunk was copied to the persistent region-locator; and
using the persistent region-locator to produce the replica of data of the selected chunk by:
copying data from content entries in the journal for the offsets in the list; and
copying data from the target disk for other offsets.

15. The method of claim 13, wherein generating the replica comprises:
examining metadata entries in the journal to identify entries related to last write operations to the selected chunk that occurred before the specified time point;
generating a region-locator, wherein the region-locator includes a list of offsets and, for an offset in the list, a reference to a content entry that includes data of the last write to the offset; and
using the region-locator to produce the replica of data of the selected chunk by:
copying data from content entries in the journal for the offsets in the list; and
copying data from the target disk for other offsets.

16. A system comprising:
a recovery system configured to protect data of a protected storage system, wherein the recovery system comprises:
a target disk configured to store a replica of the protected storage system from before a time window; and
a journal comprising data and metadata of write operations to the protected storage system that occurred during the time window;
a storage device;
a processor configured to verify consistency of the replicated data, concurrently with the protecting, by:
receiving a signature of a selected chunk of the protected storage system at a specified time point;
generating a replica of the selected chunk from the target disk and the journal, from the specified time point;
generating a signature of the replica;
comparing the signature of the selected chunk with the signature of the replica;
repeating the receiving, generating and comparing for a plurality of chunks; and
reporting results of the comparison to a user.

17. The system of claim 16, wherein the processor is further configured to:
repeat the copying, generating and comparing for substantially all chunks of the protected storage system in a cyclic manner.

18. The system of claim 16, further comprising a protected storage system, wherein the protected storage system is configured to:
copy the data of the selected chunk of the protected storage system at the specified time point, while monitoring attempted write operations to the protected system;
generate a signature of the copied data; and
send the signature to the processor.

19. The system of claim 18, wherein the recovery system is further configured to amend data stored in the recovery system according to the data of the copied chunk.

20. The system of claim 18, wherein the protected storage system is further configured to discard attempted write operations to the selected chunk that occur during the copying.

21. The system of claim 18, wherein the protected storage system is further configured to store attempted write operations to the selected chunk that occur during the copying in a queue and to perform the stored attempted write operations after the copying is completed.

22. The system of claim 18, wherein the protected storage system is further configured to store attempted write operations to the protected storage system that occur during the copying in a queue and to perform the stored attempted write operations after the copying is completed.

23. The system of claim 18, wherein the protected storage system is further configured to:
detect attempted write operation to the chunk;
store attempted write operations to the protected storage system that occur after an attempted write operation to the selected chunk is detected and during the copying in a queue; and
perform the stored attempted write operations after the copying is completed.

24. The system of claim 18, wherein the protected storage system is further configured to stop the verifying of the selected chunk if an attempted write operation to the selected chunk is detected.

25. The system of claim 16, wherein the recovery system is an object based recovery system.

26. The system of claim 16, wherein the recovery system is configured to protect data by:
storing, in the target disk, the replica of the protected storage system from before the time window;
obtaining information related to a write operation in the protected storage system, the information including: copy of data stored on the protected storage system, and metadata related to the stored data;
maintaining the journal by:
storing a copy of the stored data in a content entry;
storing at least a portion of the metadata in a metadata entry; and
associating the metadata entry with the content entry; and
periodically applying data received before the time window from the journal to the target disk.

27. The system of claim 26, wherein the processor is further configured to generate the replica of the selected chunk by:
examining metadata entries in the journal to identify entries related to last write operations, that occurred before the specified time point;
generating a region-locator, wherein the region-locator includes a list of offsets and, for an offset in the list, a reference to a content entry that includes data of the last write to the offset; and
using the region-locator to produce the replica of the selected chunk by:
copying data from content entries in the journal for the offsets in the list; and
copying data from the target disk for other offsets.

28. The system of claim 26, wherein the processor is further configured to:
generate a persistent region-locator, wherein the persistent region-locator includes a list of offsets and, for an offset in the list, a reference to a content entry that includes data of the last write to the offset; and
generate the replica by:
updating the persistent region-locator to the specified time point by:
removing applied write operations from the persistent region-locator; and
adding new write operations that occurred after the previous chunk was copied and before the selected chunk was copied to the persistent region-locator; and
using the persistent region-locator to produce the replica of data of the selected chunk by:
copying data from content entries in the journal for the offsets in the list; and
copying data from the target disk for other offsets.

29. A system comprising:
a recovery system configured to protect data of a protected storage system, wherein the recovery system comprises:
a target disk configured to store a replica of the protected storage system from before a time window; and
a journal comprising data and metadata of write operations to the protected storage system that occurred during the time window;
a storage device;
a processor configured to verify consistency of the replicated data, concurrently with the protecting, by:
receiving data of a selected chunk of the protected storage system at a specified time point;
generating a replica of the selected chunk in the recovery system from the target disk and the journal, from the specified time point;
comparing the copied data with the replica of the chunk;
repeating the copying, generating and comparing for a plurality of chunks; and
reporting results of the comparison to a user.

* * * * *